US006959378B2

(12) United States Patent

Nickolls et al.

(10) Patent No.: US 6,959,378 B2

(45) Date of Patent: Oct. 25, 2005

(54) RECONFIGURABLE PROCESSING SYSTEM AND METHOD

(75) Inventors: John R. Nickolls, Los Altos, CA (US); Scott D. Johnson, Mountain View, CA (US); Mark Williams, San Jose, CA (US); Ethan Mirsky, Mountain View, CA (US); Kambdur Kirthiranjan, Milpitas, CA (US); Amrit Raj Pant, Mountain View, CA (US); Lawrence J. Madar, III, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 600 days.

(21) Appl. No.: 10/004,246

(22) Filed: Nov. 2, 2001

(65) Prior Publication Data

US 2002/0087846 A1 Jul. 4, 2002

Related U.S. Application Data

(60) Provisional application No. 60/246,423, filed on Nov. 6, 2000, and provisional application No. 60/246,424, filed on Nov. 6, 2000.

(51) Int. Cl.[7] ............................ G06F 9/30; G06F 19/00

(52) U.S. Cl. ........................................ 712/229; 712/226

(58) Field of Search .............................. 712/229, 24, 2, 712/10, 15, 226

(56) References Cited

U.S. PATENT DOCUMENTS

| | | | | |
|---|---|---|---|---|
| 5,684,980 A | * | 11/1997 | Casselman | 703/23 |
| 5,745,721 A | | 4/1998 | Beard et al. | |
| 5,832,290 A | | 11/1998 | Gostin et al. | |
| 5,933,642 A | * | 8/1999 | Greenbaum et al. | 717/140 |
| 5,966,528 A | * | 10/1999 | Wilkinson et al. | 712/222 |
| 6,023,564 A | | 2/2000 | Trimberger | |

FOREIGN PATENT DOCUMENTS

| | | |
|---|---|---|
| EP | 0 227 900 A2 | 7/1987 |
| EP | 0 729 091 A | 8/1996 |
| WO | WO 00 49496 A | 8/2000 |

OTHER PUBLICATIONS

Jacob, et al., "Memory Interfacing Instruction Specification for Reconfigurable Processors," ACM/SIGDA International Symposium on Field Programmable Gate Arrays. FPGA '99. Monterey, CA, Feb. 21–23, 1999, New York, NY, Feb. 21, 1999, pp. 145–154, XP000868486, ISBN: 1–58113–088–0, p. 147–p. 148.

WO 99 42922 A (Knuth Robert); Siemens AG (DE); Shenderovitch Georgiy (IL); Granot) (Aug. 26, 1999).

"Selecting Predecoded Instructions with a Surrogate," IBM Technical Disclosure Bulletin, IBM Corp., New York; US, vol. 36, No. 6A, (Jun. 1, 1993) pp. 35–38, XP000370750, ISSN: 0018–8689.

Search Report, Patent Cooperation Treaty, Sep. 23, 2002, 6 pages.

* cited by examiner

*Primary Examiner*—Henry W. H. Tsai

(74) *Attorney, Agent, or Firm*—Christie, Parker & Hale, LLP

(57) ABSTRACT

A reconfigurable processing system executes instructions and configurations in parallel. Initially, a first instruction loads configurations into configuration registers. The configuration field of a subsequently fetched instruction selects a configuration register. The instruction controls and controls of the configuration in the selected configuration register are decoded and modified as specified by the instruction. The controls provide data operands to the execution units which process the operands and generate results. Scalar data, vector data, or a combination of scalar and vector data can be processed. The processing is controlled by instructions executed in parallel with configurations invoked by configuration fields within the instructions. Vectors are processed using a vector register file which stores vectors. A vector address unit identifies addresses of vector elements in the vector register file to be processed. For each vector, vector address units provide addresses which stride through each element of each vector.

35 Claims, 17 Drawing Sheets

| | Field | Bits | Description |
|---|---|---|---|
| 546 | rw_sel | 59:56 | Register W port selection, r0 – r15. |
| 544 | rx_sel | 55:52 | Register X port selection, r0 – r15. |
| 542 | ry_sel | 51:48 | Register Y port selection, r0 – r15. |
| 540 | ra_sel | 47:44 | Register A port selection, r0 – r15. |
| 538 | rb_sel | 43:40 | Register B port selection, r0 – r15. |
| 536 | rc_sel | 39:36 | Register C port selection, r0 – r15. |
| 534 | rd_sel | 35:32 | Register D port selection, r0 – r15. |
| 532 | rw_op | 31:30 | Register W write select. 0 = no write, 1 = alu_out, 2 = shift_out, 3 = mul_out. |
| 530 | rx_op | 29:28 | Register X write select. 0 = no write, 1 = alu_out, 2 = shift_out, 3 = mul_out. |
| 528 | ry_op | 27:26 | Register Y write select. 0 = no write, 1 = alu_out, 2 = shift_out, 3 = mul_out. |
| 526 | mul_op | 25:24 | Multiply high/low word select. 0 = lo *lo, 1 = lo* hi, 2 = hi * lo, 3 = hi * hi. |
| 524 | mul_bsel | 23:22 | Multiplier operand B select. 0 = ra, 1 = rb, 2 = rc, 3 = rd. |
| 522 | mul_asel | 21:20 | Multiplier operand A select. 0 = ra, 1 = rb, 2 = rc, 3 = rd. |
| 520 | alu_bsel | 19:18 | ALU operand B select. 0 = ra, 1 = rb, 2 = rc, 3 = rd. |
| 518 | alu_asel | 17:16 | ALU operand A select. 0 = ra, 1 = rb, 2 = rc, 3 = rd. |
| 516 | alu_op | 15:13 | ALU operation: 0 = pass, 1 = add, 2 = sub, 3 = min, 4 = max, 5 = and, 6 = or, 7 = xor. |
| 514 | shf_bsel | 12:11 | Shift operand B select. 0 = ra, 1 = rb, 2 = rc, 3 = rd. |
| 512 | shf_asel | 10:9 | Shift operand A select. 0 = ra, 1 = rb, 2 = rc, 3 = rd. |
| 510 | lstep | 8 :8 | Step (decrement) loop counter lcnt. |
| 508 | cfg_mod | 7:6 | Configuration modifier select. 0 = ALU op mod, 1 = rw op mod, 2 = rw mod, 3 = rc mod. |
| 506 | plcnt | 5:5 | Predicate execution of configuration on non-zero loop count lcnt != 0. |
| 504 | pregt | 4:4 | Specifies the 1-bit value in predicate register cfg_preg that enables execution of this configuration. |
| 502 | cfg_preg | 3:0 | Predicate execution of configuration on value of predicate register cfg_preg == pregt value. |

| | Field | Bits | Description |
|---|---|---|---|
| 1238 | rc_sel | 39:36 | Register C port selection, r0 – r15. |
| 1236 | vw_op | 35:34 | Vector register W port operation. 0 = no write, hold address vw.vca; 1 = write address rc, hold address vw.vca; 2 = write word, hold address vw.vca; 3 = write word, step current address vw.vca. |
| 1234 | vb_op | 33:32 | Vector register B port operation. 0 = no read, hold address vb.vca; 1 = read address rc, hold current address vb.vca; 2 = read word, hold address vb.vca; 3 = read word, step current address vb.vca. |
| 1232 | va_op | 31:30 | Vector register A port operation. 0 = no read, hold address va.vca; 1 = read address rc, hold current address va.vca; 2 = read word, hold address va.vca; 3 = read word, step current address va.vca. |
| 1230 | ac0_op | 29:28 | Accumulator 0 operation. 0 = hold; 1 = write ALU output, 2 = write Multiplier output, 3 = write shift output. |
| 1228 | ac1_op | 27:26 | Accumulator 1 operation. 0 = hold; 1 = write ALU output, 2 = write Multiplier output, 3 = write shift output. |
| 1226 | mul_bsel | 25:24 | Multiplier operand B select. 0 = vb, 1 = ac0, 2 = rb, 3 = rc. |
| 1224 | mul_asel | 23:22 | Multiplier operand A select. 0 = va, 1 = ac0, 2 = ra, 3 = rc. |
| 1222 | mul_op | 21:20 | Multiplier operation. 0 = A, B signed; 1 = A signed, B unsigned, 2 = A unsigned, B signed, 3 = A, B unsigned. |
| 1220 | alu_bsel | 19:18 | ALU operand B select. 0 = vb, 1 = ac0, 2 = rb, 3 = ac1. |
| 1218 | alu_asel | 17:16 | ALU operand A select. 0 = va, 1 = ac0, 2 = ra, 3 = mreg. |
| 1216 | alu_op | 15:13 | ALU operation: 0 = pass, 1 = add, 2 = sub, 3 = min, 4 = max, 5 = and, 6 = or, 7 = xor. |
| 1214 | shf_bsel | 12:11 | Shift operand B select. 0 = vb, 1 = ac0, 2 = rb, 3 = rc. |
| 1212 | shf_asel | 10:9 | Shift operand A select. 0 = va, 1 = ac0, 2 = ra, 3 = ac1. |
| 1210 | vstep | 8:8 | Step (decrement) the vector counter vcnt. |
| 1208 | cfg_mod | 7:6 | Configuration modifier select. 0 = ALU op mod, 1 = VAU op mod, 2 = rc mod, 3 = ac op mod. |
| 1206 | pvcnt | 5:5 | Predicate execution of configuration on non-zero vector count vcnt != 0. |
| 1204 | pregt | 4:4 | Specifies the 1-bit value in predicate register cfg_preg that enables execution of this configuration. |
| 1202 | cfg_preg | 3:0 | Predicate execution of configuration on value of predicate register cfg_preg ==. pregt value. |

Fig. 12B

RECONFIGURABLE PROCESSING SYSTEM AND METHOD

CROSS-REFERENCE TO RELATED APPLICATION

This application claims the benefit of U.S. Provisional Application Nos. 60/246,423 and 60/246,424, both filed Nov. 6, 2000.

FIELD OF THE INVENTION

This invention relates to a processing system. More specifically, this invention relates to a processing system that executes instructions and configurations referenced by the instruction in parallel.

BACKGROUND OF THE INVENTION

Conventional processing systems utilize parallel processing in an inefficient manner. Example conventional processors include scalar, Very Long Instruction Word (VLIW), superscalar, and vector processors.

A scalar is a single item or value. A scalar processor performs arithmetic computations on scalars, one at a time. For example, on a first clock, an instruction C=A+B is fetched. On a second clock, the instruction is decoded. On a third clock, the instruction operands A and B are retrieved. On a fourth clock, the instruction is executed. On a fifth clock, the result C of the executed instruction is written to memory. This process may proceed in a pipelined manner with new instructions fetched on each subsequent clock and processed through the remaining five clock cycles as previously described. However, a scalar processor uses only limited parallelism, limited by the number of pipeline stages. Further, although the processor may have multiple execution units for different functions such as add, multiply, and shift, only one execution unit is used during each clock cycle, limited by the scalar instruction. Thus, although pipelined processing may be implemented with scalar systems, multiple scalar elements are not processed in parallel resulting in impediments to efficient instruction processing.

VLIW processors have an architecture that processes multiple scalar instructions simultaneously or in parallel by including multiple instructions into a wide single instruction, i.e., a very long instruction word (VLIW) includes multiple scalar instructions as previously described.

One example VLIW instruction is a 256 bit VLIW. Multiple independent instructions can be incorporated into a single VLIW instruction. For example, a VLIW instruction may include instruction sections for an adder, a shifter, a multiplier, or other execution units. Thus, the VLIW instruction enables an execution unit such as an adder to proceed in a pipelined fashion and, in addition, enables other components, such as a shifter or multiplier, to proceed in parallel with the adder.

While a VLIW processing system may reduce processing times by executing multiple instructions within a single wide instruction word, this system has a number of shortcomings. For example, larger amounts of wider memory are used to store a series of wide instruction words. As a result, additional logic and interconnect wiring are used to manage the wider memory. These extra logic and wiring components consume additional area, power, and bandwidth to fetch these wider instructions—on each clock, a 256 bit instruction is fetched.

Also, in response to the limited parallelism of scalar processing systems, superscalar processors were developed. Superscalar processors are similar to VLIW systems but can execute two or more smaller instructions in parallel. Multiple smaller instructions are fetched per clock cycle, and if there are no conflicts or unmet dependencies, multiple instructions can be issued down separate pipelines in parallel. While superscalar processors may utilize narrower or shorter instructions and process multiple instructions in parallel, other problems remain in the complexity of selecting instructions that can issue in parallel without conflicting demands and in accessing operands in parallel. Additionally, concerns about interactions between pipelines and permitting other components to be idle until an instruction is completely executed still remain.

Vector processors process vectors or linear arrays of data elements or values, e.g., scalar values, arranged in one dimension, e.g., a one dimensional array. Example vector operations include element-by-element arithmetic, dot products, convolution, transforms, matrix multiplications, and matrix inversions. Vector processors typically provide high-level instructions that operate on a vector in a pipelined fashion, element by element. A typical instruction can add two 64-element vectors element by element in a pipeline to produce a 64-element vector result, which would also be generated by a complete loop on a scalar processor that computes one element per loop iteration. Vector processing units, however, typically provide limited sequential control capacity. For example, a separate scalar unit is typically used to perform scalar computations using sequential decisions.

For example, a vector processor may pass vector operands to a single pipelined functional unit, e.g., an adder. If a vector instruction calls for C=A+B, each element of vectors A and B are sequentially added with a single functional adder and stored element by element to a vector C. In pipelined fashion, during a first clock, the first element of each vector is processed with an adder, e.g., A1+B1, and stored to C1 of vector C. During a second clock, the second element of each vector is processed with an adder, e.g., A2+B2, and stored to C2 of vector C. During a third clock, the third element of each vector is processed with an adder, e.g., A3+B3, and stored to C3 of vector C, and so on for each element.

Thus, performing an operation on "x" elements may require "x" clock cycles and additional clock cycles to manage overhead operations. Consequently, conventional vector processors are limited in that they utilize a complex control unit to sequence vector processing element by element, one clock per element, resulting in many clock cycles to execute one vector instruction. This problem is further amplified when more complex instructions are processed. Additionally, when processing of one element is completed, a control system must move the processing from the element just processed to the next element. Further, control of other execution units such as a multiplier, shifter, etc. are further complicated and use of these units is delayed until the instruction is completed and each element of the vector has been processed through respective clock cycles. Thus, other instructions relating to other execution units are unnecessarily delayed or require complex "vector chaining" controls to manage parallel instruction execution with different units.

Some processing systems that use co-processors or reconfigurable arrays have synchronization problems with the execution of the application program. Further, some conventional systems utilize one processor to execute an application program with the assistance of a co-processor or a reconfigurable computing array. As a result, such systems utilize an asynchronous request/acknowledge handshake between the separate processor and the co-processor or reconfigurable array. These handshakes result in either the processor waiting for the array, or the array waiting for the processor. In both cases, the result is inefficient use of the processor in performing fine-grain requests because the overhead can exceed the array run time.

In summary, shortcomings of conventional processing systems relating to the complexity of issuing parallel instructions, instructions with many bits, bandwidth and power used fetching wide instructions, additional instruction memory, logic, and/or area, larger bandwidth, diminished processing speeds, and asynchronous processor communications.

Accordingly, there is a need in the art for a processing system that executes instructions in a more time, cost, and space efficient manner by enhancing the control and utilization of parallel processing.

SUMMARY OF THE INVENTION

In one aspect of the present invention, a reconfigurable processor is implemented with an instruction appended with a configuration field. The configuration field selects a configuration register which stores a configuration. Controls decoded from the instruction and from the configuration stored in the selected configuration register are executed in parallel.

DESCRIPTION OF THE DRAWINGS

These and other features, aspects, and advantages of the present invention will become better understood with regard to the following description, appended claims, and accompanying drawings where:

FIGS. 5A–B illustrate an example configuration register used in a reconfigurable processing system;

FIGS. 12A–B illustrate an example configuration register used in a reconfigurable vector processor.

DETAILED DESCRIPTION

Figure 1:
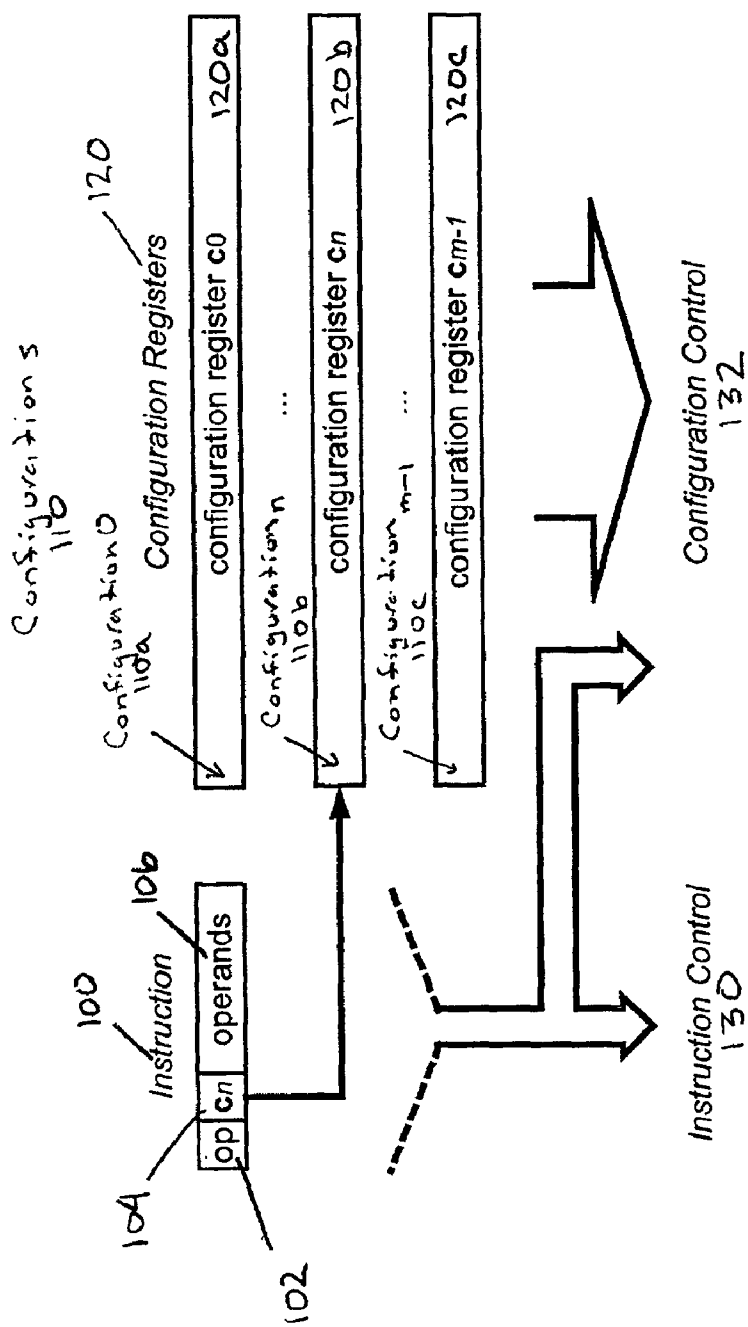
FIG. 1 is a general flow diagram illustrating the manner in which instructions and configurations are controlled and executed in parallel.

Referring to FIG. 1, the reconfigurable processor executes an instruction 100 and a selected configuration or configuration context 110*a–c* (generally configuration 110) stored in a selected configuration register 120*a–c* (generally configuration register 120). Configurations 110 are loaded into one or more configuration registers 120 from a memory. For example, a compiler or programmer defines the configuration 110 in memory using, for example, assembler syntax. Examples of two configurations 110 in assembler syntax are provided below:

```
cfg_addr1:   .config add r0, r0, r1 || mul r1, r2.lo, r3.lo
cfg_addr2:   .config add r0, r0, r1 || mul r1, r2.hi, r3.hi
```

The example configurations 110 specify a multiply-accumulate operation on two arrays. A multiplier product r1 is added to a value in accumulator register r0. Additionally, in parallel with the add operations, two array elements, r2 and r3, are multiplied together into r1. The "lo" and "hi" designations refer to a "lo" 16 bits or a "hi" 16 bits of a 32 bit operand.

An instruction 100 that selects a configuration register 120 causes configuration 110 stored in the selected configuration register 120 to be executed. The configuration 110 execution reconfigures the processor. One example instruction 100 that can be utilized for this purpose includes operation code (op) 102, a configuration select field or configuration field (cn) 104, and operands 106. When an instruction 100 is invoked, the configuration field cn 104 selects a configuration register 120 which stores a configuration 110. The configuration 110 stored in the selected configuration register 120 and the corresponding instruction 100 are decoded into respective instruction controls 130 and configuration controls 132. The controls 130 and 132 dynamically reconfigure the data path such that the instruction 100 and configuration 110 are executed in parallel.

The controls 132 decoded from the configuration 110 provide additional control signals that control one or multiple parallel execution units in addition to the execution unit controlled by the instruction 100. The role of the configuration 110 in the reconfigurable processor can vary depending on the type and number of execution units requested. For example, a configuration 110 can control one, two, three, or other numbers of execution units depending on the decoded configuration controls 132.

Reconfigurable Processing System—Instruction Format

Figure 2A:
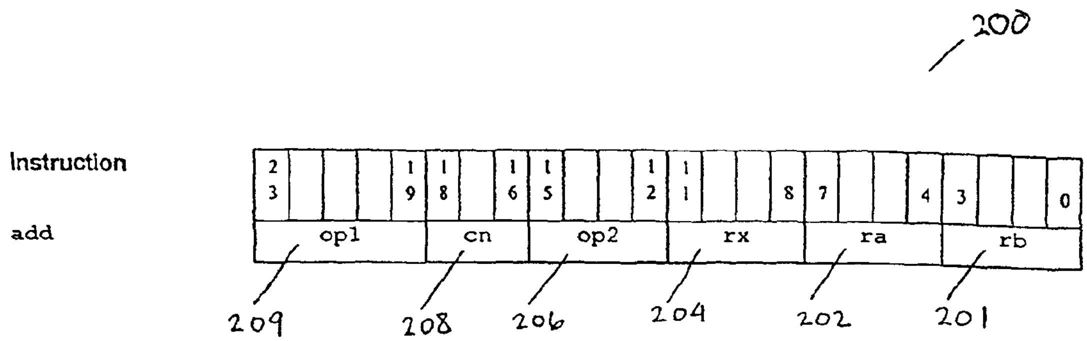
FIGS. 2A–B illustrate example instruction formats including a configuration field.
Figure 2B:
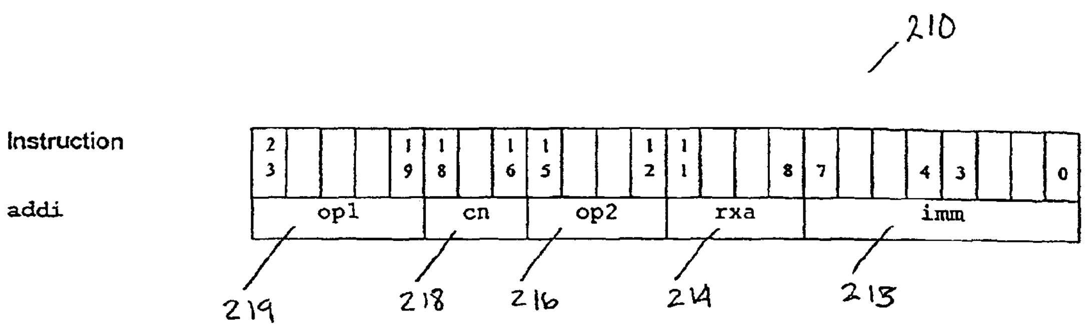

FIGS. 2A–B illustrate example instruction formats including configuration fields that can invoke configurations which provide additional configuration controls to reconfigure a processor.

Referring to FIG. 2A, one example instruction format that can be executed by the reconfigurable processing system is a 24-bitt add instruction format 200 (bits 0–23). Beginning from bit 0, a source register rb 201 is identified with a four bit register select field (bits 0–3). Similarly, a source register ra 202 is identified with a four bit register select field bits (bits 4–7). A destination register rx 204 is identified with a four bit register select field (bits 8–11). In the illustrated example, values in the four bit source and destination register select fields select one of sixteen registers. Indeed, other numbers of bits may be used to represent different numbers of registers. The instruction operation code "op" ("opcode") is allocated between nine bits and two opcode fields, op1 209 and op2 206. The first opcode field op1 209 includes five bits (bits 19–23), and the second opcode field op2 206 includes four bits (bits 12–15). The three bit configuration field cn 208 selects one of eight configuration registers. The previously described 24-bit add instruction format 200, the three bit configuration field cn 208, and the manner in which bits of the 24-bit instruction format 200 are allocated are merely illustrative of different instruction formats that can be utilized.

The example 24-bit add instruction format 200 illustrated in FIG. 2A is represented in the following syntax and operation (e.g., C-like language) form as follows:

| | |
|---|---|
| Syntax: | add rx, ra, rb ‖ cfg cn |
| Operation: | cfg(cn), rx = ra + rb |

The instruction syntax specifies the operation keyword add, destination register operand rx 204, and source register operands ra 202 and rb 201. The configuration syntax uses ‖ indicate that the add instruction format 200 is executed in parallel with the configuration stored in the configuration register selected by the configuration field cn 208.

The operation of the configuration is indicated as a call of function cfg with the configuration field cn 208 as an argument. The assembler syntax ‖ cfg cn is assembled into the three bit cn field 208 of each instruction format. The configuration controls decoded from the configuration in the selected configuration register configure one or more execution units to perform additional operations in parallel with the add instruction format 200.

The add instruction format 200 is further specified by instruction opcode fields op1 209 and op2 206, which are decoded by a processor instruction decode unit. The opcode field op1 209 is decoded as an instruction supporting a concurrent configuration operation. Opcodes 206, 209 assert controls to read source registers ra 202 and rb 201, add the values within these registers, and write the result to destination register rx 204.

Operands requested by a configuration can be retrieved from different sources. For example, operands can be stored in the configuration itself or provided by the instruction invoking the configuration. More specifically, the configuration function cfg(cn, ra, rb) may use the source operand register values selected by instruction fields ra 202 and rb 201. In doing so, further reconfigurations of the processing system are realized since a single configuration can be executed with different instructions and operands to generate different configuration controls and results.

Instead of retrieving operands from a register or other memory, instructions can also be arranged to process immediate values. Immediate values are bytes or words included within instruction fields rather than being stored in a register that is referenced by a register select field of the instruction. Instructions with immediate value fields provide the immediate values to the selected configuration in addition to being processed by the instruction.

For example, referring to FIG. 2B, the addi instruction format 210 includes an immediate value field imm 213. The addi instruction format 210 is similar to the add instruction format 200 in FIG. 2A in that the addi instruction format 210 includes a source and destination register rxa 214, op code field op2 216, configuration field cn 218, and op code field op1 219.

The example addi instruction can be described in the following syntax and operation form:

| | |
|---|---|
| Syntax: | addi rxa, imm ‖ cfg cn |
| Operation: | cfg(cn, rxa, imm), rxa = rxa + imm |

Instructions that write a source/destination register rxa 214 can obtain the result value from an execution unit controlled by the specified configuration.

One example cfgaoutri instruction using the same instruction format illustrated in FIG. 2B, can be described in the following syntax and operation form:

| | |
|---|---|
| Syntax: | cfgaoutri cn, rxa, imm |
| Operation: | rxa = cfg_alu_out(cn, rxa, imm) |

This example cfgaoutri instruction provides values in source/destination register rxa 214 and immediate imm 213 to the configuration of the selected configuration register. The instruction executes the configuration and captures the configured ALU output in the source/destination register rxa 214. Indeed, the illustrated example instruction formats are merely illustrative of other instruction formats that can utilize a configuration field as previously described.

In some cases, instruction controls override conflicting configuration controls decoded from a configuration. For example, a shift instruction can override configuration controls for the shift unit, thus allowing a shift instruction to execute concurrently with a configuration 210 performing multiply and add operations.

Further, configuration controls can control idle execution units. For example, if an instruction, such as the cfgaoutri instruction, does not explicitly use any execution unit (e.g., ALU), then the configuration controls can control that ALU instead of leaving the ALU idle. As a result, the configuration can flexibly control all of the execution units, further enhancing parallel processing capabilities.

With any of the previously described example instructions, the reconfigurable processing system can be designed with a default configuration. The default configuration can serve as a disable function. More specifically, when a configuration with a default value is invoked from an instruction, only the instruction is executed in different manners. For example, a system can be designed such that a configuration field cn value of "000" results in the selection of configuration register c0. The configuration stored in configuration register c0 is decoded as a null configuration. The null configuration results in only the instruction operations being executed. As another example, the configuration field cn defines a value such as "000" which results in a configuration register not being selected. Thus, only the operations specified by the instruction are executed. Specific instruction opcodes can override this designation to provide limited use of a loadable configuration register c0.

Having described example instruction formats that include a configuration field cn and how configurations can control processor reconfiguration, following is a detailed description of the processor components that are used with these instructions to control the reconfigurable processing system.

Reconfigurable Processing System—Components

Figure 3:
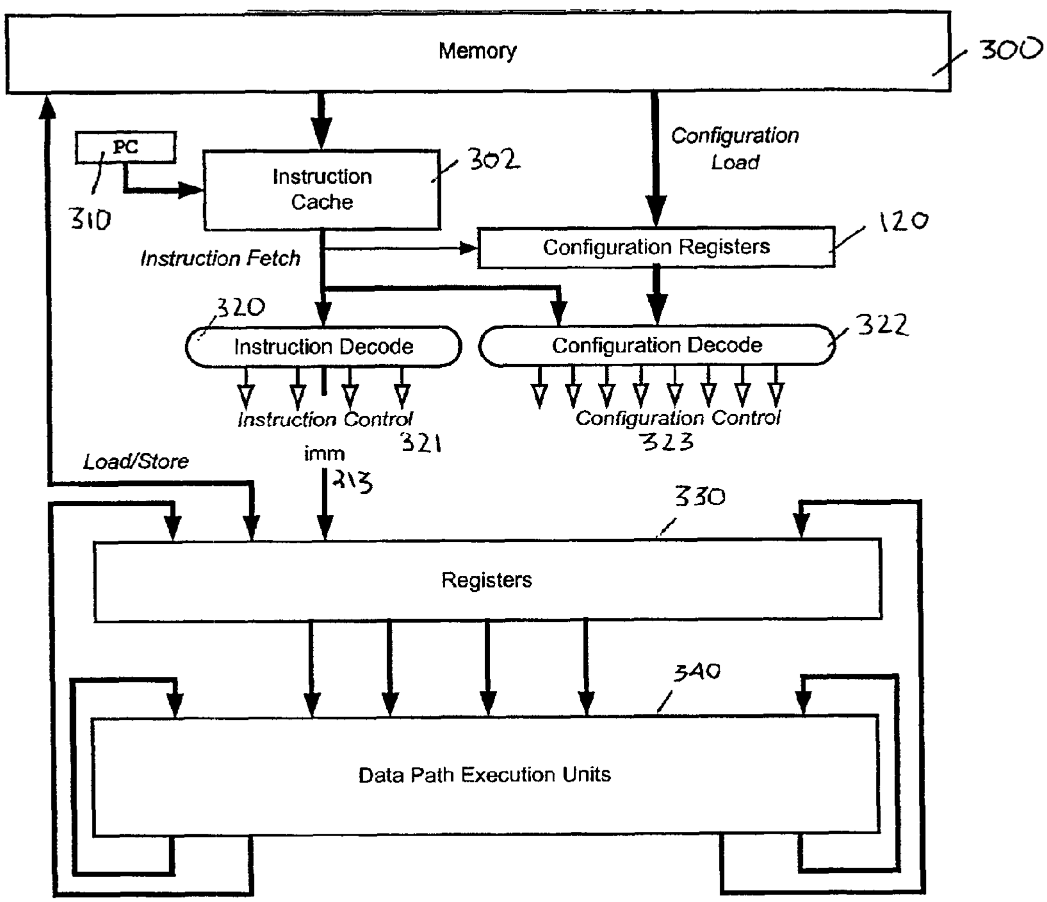
FIG. 3 is a schematic of components utilized to control a reconfigurable processing system.

Referring now to FIG. 3, one embodiment of the reconfigurable processing system includes a memory 300, an instruction cache 302, one or more configuration registers 120, a program counter (PC) 310, an instruction decode unit 320 which generates instruction controls 321, a configuration decode unit 322 which generates configuration controls 323, registers 330, and execution units 340.

The memory 300 stores program instructions, configurations, and/or operands or data. The memory 300 can store data and instructions in the same memory or in separate memories.

The PC 310 contains an address within the memory 300 of the instruction requested by the processor. The selected instruction is fetched from memory 300 to the instruction cache 302 or other memory where the instruction is stored until executed.

Configurations are loaded from the memory 300 to their respective configuration registers 120. The instruction and the configuration from the selected configuration register 120 are decoded by the instruction decode unit 320 and a configuration decode unit 322 into respective instruction 321 and configuration 323 controls. Instruction controls 321 and configuration controls 323 are provided to execution units 340 which generate results.

The registers 330 may be, for example, an array of registers. The registers 330 are coupled to the memory 300, execution units 340, and instruction decode 320 to receive immediate values 213 if applicable. Immediate values are values that are included within instruction fields rather than stored in a register referenced by a register select field of the instruction. A load or store instruction may be used to load registers 330 with data from the memory 300 or to store data from registers 330 to the memory 300. The registers 330 supply data operands to the execution units 340 in accordance with the decoded instruction 321 and configuration 323 controls. The decoded instruction 321 and configuration 323 controls read register operands, invoke execution units 340 to process the data operands, and write the results to a register 330. Thus, a configuration reconfigures and controls execution units 340 and related interconnections within the reconfigurable processing system. In one embodiment, a processor is reconfigured under control of application software.

With the previously described arrangement, configuration registers 120 can be loaded with configurations without the use of an external processor or agent. Further, if multiple configuration registers 120 can be selected, the reconfigurable processing system can execute one configuration while pre-loading another configuration in the background while the previously loaded configuration executes in the first configuration register 120. As a result, multiple configurations can provide flexible control within complex code sequences and permit concurrent background pre-fetching or pre-loading of new configurations.

Further, with the previously described arrangement, a first instruction can be used to load configuration registers 120 from the memory 300 with respective configurations, and a second instruction with a configuration field cn can invoke a configuration to reconfigure the processor. With separate instructions, an application program can statically schedule instructions that load configuration registers and subsequently use them. As a result, wait times to fetch configurations from memory are reduced.

Figure 4:
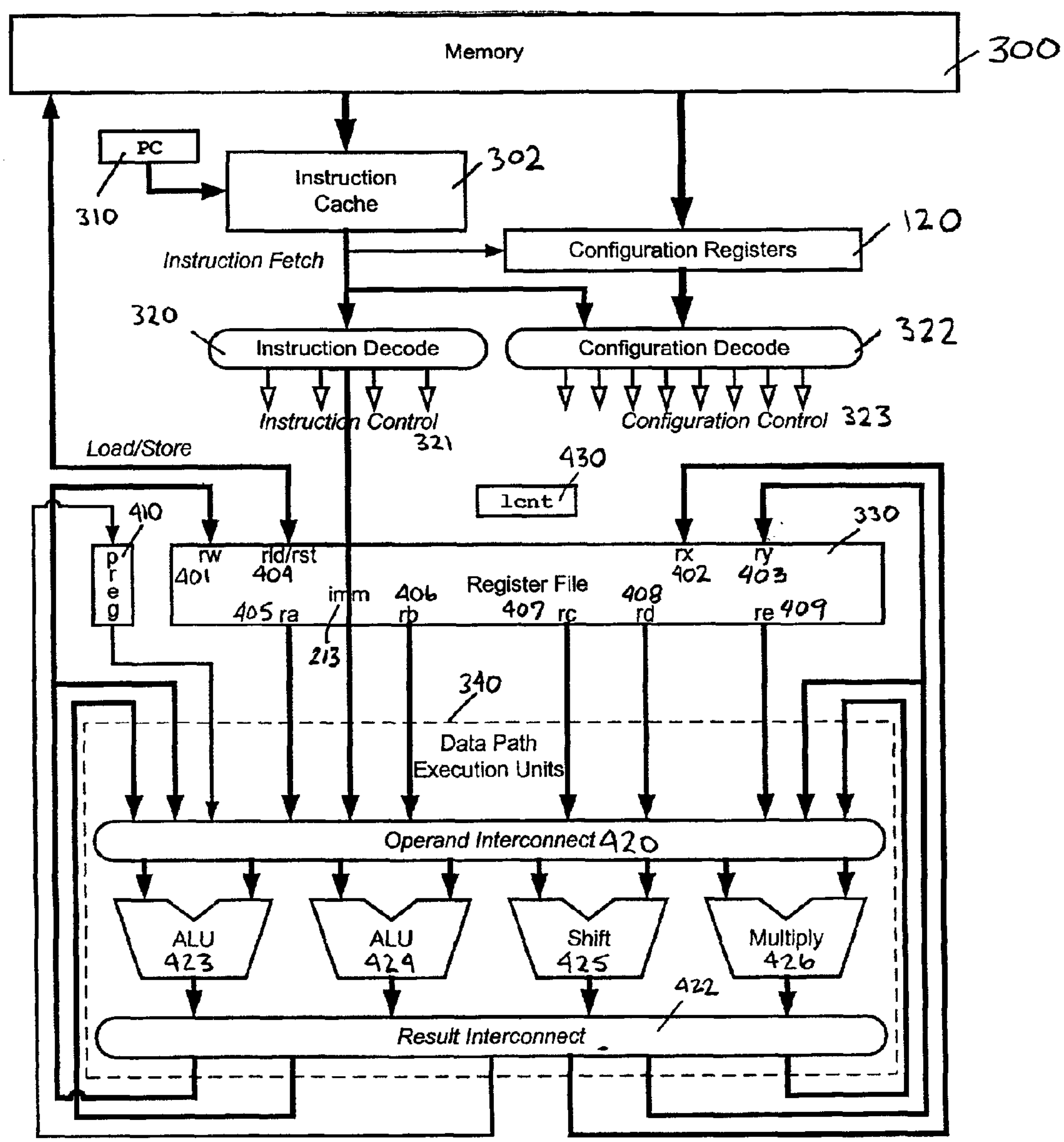
FIG. 4 is a more detailed schematic of components utilized to control a reconfigurable processing system.

FIG. 4 provides a more detailed schematic of the registers 330 and data execution units 340 of FIG. 3. In one embodiment, the registers 330 form a register file 400. Data can be written to or read from a register of the register file 400 through a data port. In the illustrated example, the register file 400 includes three write ports, a read/write port, and five read ports. The write ports include port rw 401, port rx 402, and port ry 403. The read/write port is port rld/rst (register load/register store) 404. The read ports include port ra 405, port rb 406, port re 407, port rd 408, and port re 409.

In one embodiment, the register file 400 holds sixteen working values of 32 bits. The ports are arranged to write data to or read data from one of the sixteen registers of the register file 400. Each register in the register file 400 corresponds to a binary 32-bit value which can be selected with a 4-bit register select field, e.g., source register fields 201, 202 and destination register field 204 in FIG. 2A. For example, in a write request, data is written through a designated write port to the selected register in the register file 400 according to instruction or configuration controls. Indeed, different numbers of registers may be used, and the register file 400 can be designed with different numbers of read and write ports to support different degrees of parallel processing. Thus, the illustrated register file 400 design is provided merely as an example.

The function unit preg 410 includes sixteen 1-bit predicate registers which hold the status or result of certain operations. These predicate registers serve as condition code registers. For example, operations, branches, moves, configurations, and operations can be predicated or conditioned on a predicate register value.

The block representing execution units 340 in FIG. 3 is illustrated in further detail in FIG. 4. The execution unit 340 block includes an operand interconnect 420, result interconnect 422, and individual execution units, e.g., Arithmetic Logic Unit (ALU) 423, ALU 424, shift unit 425 and multiply unit 426.

The operand interconnect 420 includes a series of busses and multiplexers (not illustrated). The result interconnect 422 receives results generated by execution units and serves as an interface between the execution units and the appropriate inputs. In this example, each input of each execution unit 423–426 is associated with an output of a 4-1 multiplexer coupled to the bus system. The register file 400 write port rw 401 is coupled to an output of the result interconnect 422, i.e., receives a result generated by an execution unit. The register file 400 read/write port rld/rst 404 is coupled to memory 300 such that data can be loaded from or stored to memory 300. Register file 400 write ports rx 402 and ry 403 also receive an output of result interconnect 422. Register file 400 read ports ra 405, rb 406, rc 407, rd 408, and re 409 are coupled to inputs of operand interconnect 422.

According to the instruction 321 and configuration controls 323, execution units receive data operands through the operand interconnect 420 from the register file 400, predicate registers 410, other internal registers, immediate instruction fields, and/or memory 300. The execution units process the data values according to the decoded controls 321, 323. The results generated by the execution units are written to internal registers, the register file 400, the predicate registers 410, memory 300, or a combination thereof through result interconnect 422.

Execution units can also be pipelined with pipeline registers between execution stages and register bypass multiplexers that forward pipelined results to the inputs of the next execution unit. Further, the operand interconnect 420 and result interconnect 422 can include pipeline registers in addition to the connection lines and multiplexers used to implement an interconnect.

In the event that an instruction sequence is permitted to control sequential operations while a configuration sequence selected by that instruction sequence controls parallel operations, a loop counter lcnt 430 is provided to count the number of loop operations.

As a result of using a relatively narrow instruction that invokes one or more configurations, cooperative sequences of narrow instructions and configurations enhance processing parallelism, speed, efficiency, and instruction density. Further, in a pipelined implementation, configuration registers can control several stages of pipeline registers.

Having described the instructions and components utilized in a reconfigurable processor, following is a more detailed description of the configuration registers and the manner in which configuration registers can be loaded with configurations.

Reconfigurable Processing System—Configuration Registers

The reconfigurable processing system enhances parallelism and processing speed and efficiency by realizing the benefits of a wider instruction while fetching a narrower instruction. These advantages are achieved by utilizing instructions that invoke configurations in effect serving as a wider instruction. As a result, narrower instructions with a configuration field cn can be fetched and processed, thereby reducing the time required to fetch instructions, the transmission bandwidth, and the memory to store longer instructions. Configurations can be narrower, the same width as, or wider than the instruction, thus providing processing flexibility. For example, configurations and their corresponding configuration registers can be, e.g., 30–100 bits wide. Indeed, configurations and their corresponding configuration registers can be narrower or wider than the example range of 30–100 bits. Configuration registers are sufficiently wide to enable the use of orthogonal operation and operand encoding, which improves efficiency of compiler-generated code sequences, and enables a compiler or programmer to schedule several independent operations in parallel on each cycle. In addition, the configuration width can be matched to the width of an instruction cache fill transfer path, e.g., 128 or 256 bits, thus leveraging the instruction cache fill mechanism that is present in some processors. Configurations can be arranged with more or less bits as needed depending on the applications involved and number of parallel execution units utilized.

Figure 5A:
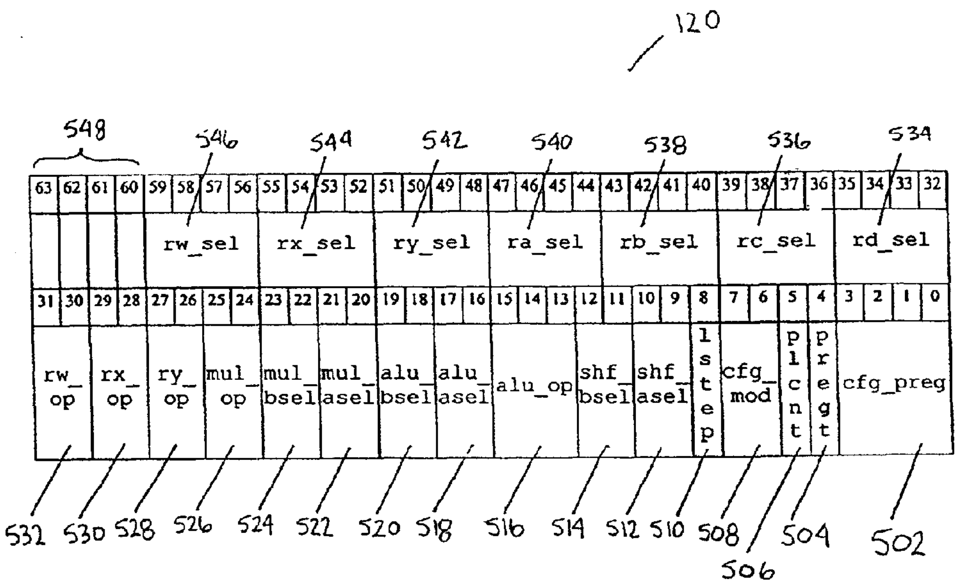

Referring to FIGS. 5A–B, one embodiment of a configuration register 120 includes 64 configuration bits that control resources of a reconfigurable processing system. More specifically, four bits (bits 0–3) are allocated to a cfg_preg field 502. The cfg_preg field 502 provides for the predicated or conditioned execution of a configuration based on a binary value of the predicate register preg 410, matching the value pregt 504, i.e., when cfg_preg=pregt.

One bit (bit 4) is allocated to a pregt field 504. The value of the pregt field 504 specifies the 1-bit value in the predicate register specified by cfg_preg 502 that enables execution of the configuration.

One bit(bit 5) is allocated to a plcnt field 506 that predicates the execution of the configuration and the value of the loop count register lcnt 430. In this example, the configuration is executed if the lcnt 430 is non-zero. The configuration is not executed if the lcnt is zero.

Two bits (bits 6–7) are provided to a cfg_mod field 508 or "mod select" field. The values of the cfg_mod field 508 can be used to select one of four configuration modifiers as follows: 0=modification of ALU operation, 1=modification of the operation of write port rw, 2=modification of write port rw register selection, and 3=modification of read port rc register selection. Example modifications include modifying an execution unit operation code, modifying a register number, inhibiting a register write, clearing a register, or stepping a counter.

One bit (bit 8) is for the field lstep 510. This field serves to step or decrement the value of loop counter lcnt when it is 1.

Bits 9–25 are used to either designate operands which will be processed by an execution unit or to select an operation to be performed by an execution unit.

Specifically, two bits (bits 9–10) are provided for the field shf_asel 512. This field is used to select operand A that will be shifted by the data path shift execution unit 425. The field values indicate which operand is selected, e.g., 0=operand on register port ra, 1=operand on register port rb, 2=operand on register port rc, and 3=operand on register port rd of register file.

Similarly, two bits (bits 11–12) are provided for the field shf_bsel 514. This field is used to select an operand, i.e., operand B, that will specify the shift amount/distance of the data path shift execution unit 425. Operand B can be selected as the register file outputs as previously described. Of course, although FIG. 4 illustrates one Shift execution unit, an additional shift execution unit may be used and one or more fields may be dedicated to each shift unit.

Three bits (bits 13–15) are allocated to the field alu_op 516 which selects one of eight possible operations that will be performed by an ALU execution unit. For example, the three bits can be allocated to select one of the following ALU operations: 0=pass, 1=add, 2=sub, 3=min, 4=max, 5=and, 6=or, and 7=xor.

Two bits (bits 16,17) are allocated to the field alu_asel 518. This field is used to select an operand, operand A, which will be processed by an ALU. The operands are selected from one of four read ports of register file, e.g., 0=ra, 1=rb, 2=rc, and 3=rd. Similarly, two bits (bits 18,19) are dedicated to the field alu_bsel 520. This field selects an operand, operand B, which will be processed by an ALU in a similar manner.

Bits 20–23 are used to select two operands that will be multiplied together by a multiplier unit. Specifically, a mul_asel field 522 with two bits (bits 20–21) can identify one of four read ports of register file, e.g., 0=ra, 1=rb, 2=rc, and 3=rd. The identified read port provides operand A to the multiplier unit. Similarly, the mul_bsel field 524 with two bits (bits 22–23) identifies one of four read ports of register file in a similar manner. The mul_op field 526 with two bits (bits 24,25) is used to select a high/low word combination for a multiply operation on two operands. With bits 24 and 25, the following selections are possible: 0=lo*lo, 1=lo*hi, 2=hi*lo, and 3=hi*hi. As previously explained, two operands A and B can each include 32 bits. Each group of 32 bits can be divided into a "lo" group of 16 bits and a "hi" group of 16 bits. Thus, the multiply operation can be further specified as follows: 0=A(lo)*B(lo), 1=A(lo)*B(hi), 2=A(hi)*B(lo), and 3=A(hi)*B(hi).

Bits 26–31 are allocated to designate result data from an execution unit that will be written to write ports rw, rx, and ry of the register file. Specifically, the configuration register field rw_op (bits 30–31) 532 designates write port rw, register field rx_op (bits 28–29) 530 designates write port rx, and register field ry_op (bits 26–27) 528 designates write port ry. The write ports either receive no data or receive a result from an execution unit and write the result to the selected register.

For example, the result operand provided to a write port can be based on the following bit representations: 0=no write (no data written to the write port), 1=alu_out (output of ALU written to write port), 2=shift_out (output of shift unit written to write port), and 3=mul_out (output of multiplier written to write port).

Bits 32–47 are used to select register read operands. Data from the selected registers are provided to read ports of the register file. As previously explained, the example register file holds 16 registers, each of which holds a working value of 32 bits. For each read port, four bits are allocated to select one of the sixteen registers (r0–r15).

For example, the register field rd_sel (bits 32–35) 534 corresponds to read port rd and selects one of sixteen registers. Similarly, rc_sel (bits 36–39) 536 corresponds to read port rc and selects one of sixteen registers, and field rb_sel (bits 40–43) 538 corresponds to read port rb selecting one of sixteen registers. Finally, the field ra_sel (bits 44–47) 540 corresponds to read port ra selecting one of sixteen registers. For example, register 7 would be selected for read port ra with the field ra_sel having values of (0111) (bits 47:44). Register 14 would be selected for read port rb with the field rb_sel field having values of (1110) (bits 43:40).

Bits 48–59 of the configuration register fields are used to designate one of the sixteen registers (r0–r15) selected to receive data through one of the three write ports rw, rx, and ry. For example, the four bits in the register field ry_sel (bits 48–51) select one of the sixteen registers to receive data through the write port ry. The four bits in the register field rx_sel (bits 52–55) 544 select one of the sixteen registers to receive data through the write port rx. Similarly, the four bits in the register field rw_sel (bits 56–59) select one of the sixteen registers to receive data through the write port rw.

Finally, bits 60–63 548 are left blank to complete a configuration having 64 bits such that the size of the configuration register is matched with the memory width, which can be a multiple of 32 bits, e.g., 64 bits, 128 bits, or other convenient sizes.

Reconfigurable Processing System—Configuration Load Instructions

Figure 6:
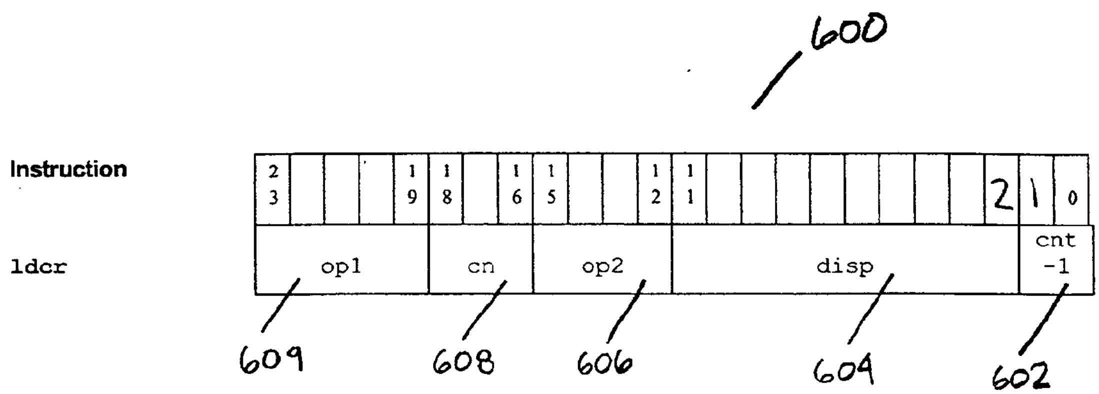
FIG. 6 illustrates an example instruction format to load configurations into a configuration register.

As previously explained, configurations 110 are loaded from the memory to configuration registers 120 by, for example, an application program. An example instruction for loading a configuration is a 24-bit ldcr instruction in FIG. 6.

The ldcr instruction 600 can be described in syntax and operation form as follows:

| | |
|---|---|
| Syntax: | ldcr cn, label * cnt |
| Operation: | cfg_load(cn, PC + disp*CFG_SIZE, cnt) |

The ldcr instruction 600 includes fields cnt-1 602, disp 604, op2 606, cn 608, and op1 609. With the two-bit cnt-1 602 field of the ldcr instruction 600, up to four configurations can be fetched from memory into the background while the application program continues to execute. For example a cnt-1=0 indicates that one configuration is fetched and loaded into a configuration register, cnt-1=1 indicates two configurations 110 are fetched, and so on.

Ten bits (bits 2–11) are allocated to the disp field 604. The assembler translates the memory address of the label of the configuration to the disp field 604. The disp field indicates the difference between the memory address of the first configuration retrieved and the memory address of the instruction to be executed as represented by Program Counter PC 310.

The 3-bit configuration field cn 608 indicates the first configuration register which will be loaded from memory 300. The disp field 604 indicates the location of the first configuration loaded within the memory 300 using PC 310+disp 604 as a memory address.

In one embodiment, a ldcr instruction loads a configuration into a configuration register. The ldcr instruction 600 to load configuration registers maybe issued by application software. In addition, application software may further initiate execution of a configuration directly by selecting a configuration register using a ∥ cfg cn operand in certain instructions. A queue of one, two or more ldcr instructions can be pending while the processor executes a previously fetched configuration.

An instruction performing a function similar to the ldcr 600 instruction is the ldcrx instruction. The lcdrx instruction takes the configuration memory address in a register, rather than as a displacement from the PC 610.

Further, the data path used to fill the instruction cache can also used to load configuration registers. For example, a 128-bit cache fill mechanism can be used to load a 128-bit configuration register with a single transfer, and leverage hardware already present in the instruction cache.

Additionally, each configuration register has a valid bit. When a ldcr instruction 600 is issued for a particular configuration register, the valid bit for that configuration register is cleared until loading of the configuration is completed. As a result, instructions that attempt to use a configuration register that is being loaded are stalled until the loading completes and the valid bit is set.

The previously described aspects of loading configuration registers provides the ability to pre-fetch configurations in advance of their use, hiding the latency of fetching configurations from memory while other instructions execute. Further, reconfiguration is synchronous with the steps of the application algorithm because the instructions to load and use configurations are part of the same application program, unlike the case where a separate processor performs reconfiguration asynchronously. Synchronous reconfiguration enables the compiler to statically schedule configuration loads early enough to hide or reduce the time the application waits for a configuration to be fetched from the memory before executing the configuration.

Reconfigurable Processing System—Modifying Configurations

Figure 7A:
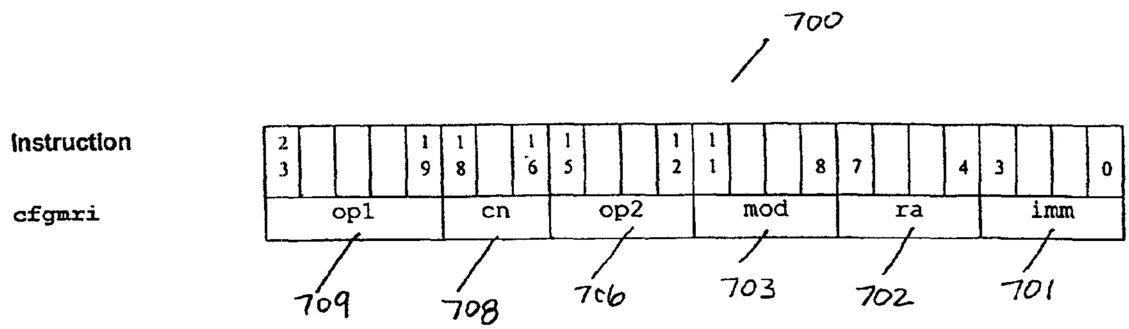
FIGS. 7A–B illustrate the manner in which configuration controls are modified.
Figure 7B:
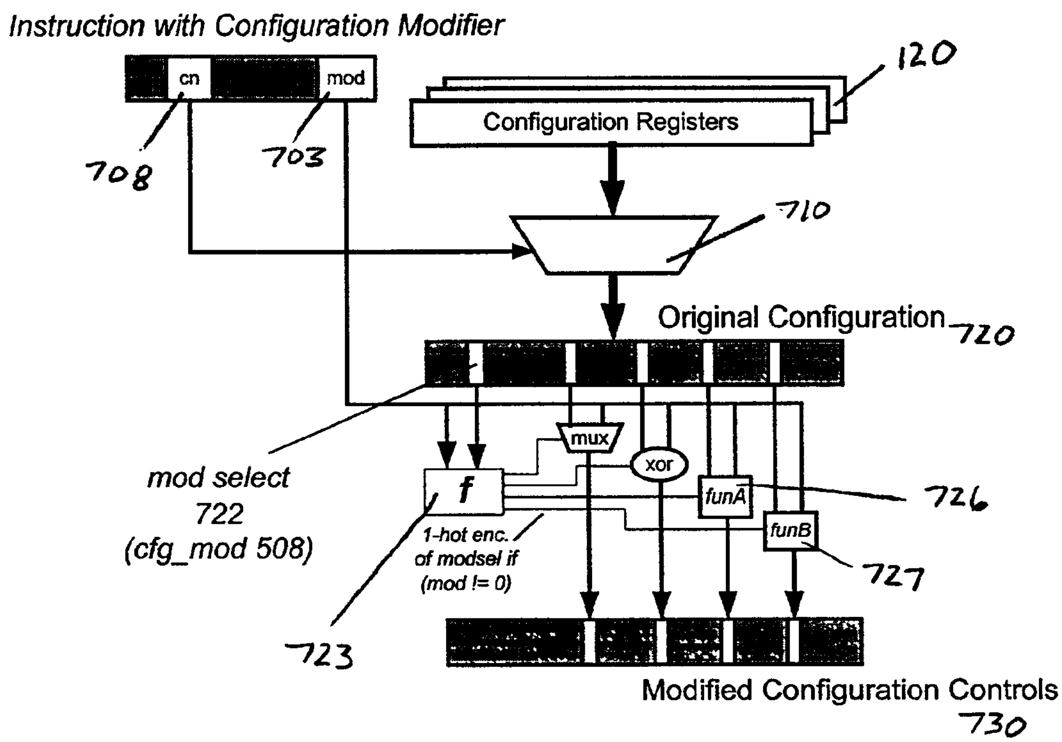

Instructions can also modify the controls decoded from a configuration. The instruction and modified configuration controls can be processed in parallel. An example modification instruction cfgmri is illustrated in FIG. 7A. The manner in which modifications are implemented is illustrated in FIG. 7B.

Referring to FIG. 7A, the cfgmri instruction 700 includes 24 bits (bits 0–23). Beginning from the right side of the instruction, a four bit immediate value field imm 701 (bits 0–3) stores immediate values. A four bit register select field ra 702 (bits 4–7) identifies the register with source values. A four bit configuration modification field mod 703 (bits 8–11) selects the modification to be executed. Similar to the previously described instructions, four bits (bits 12–15) are allocated to an operation code op2 706, three bits (bits 16–18) are allocated to a configuration field cn 708 to identify a configuration register 120, and five bits (bits 19–23) are allocated to an operation code op1 709.

An example 24-bit cfgmri instruction 700 that modifies controls decoded from a configuration can be represented in syntax and operation as follows:

| | |
|---|---|
| Syntax: | cfgmri cn, mod, ra, imm |
| Operation: | cfg(cn, mod, ra, imm) |

The instruction syntax specifies the operation keyword cfgmri, the configuration register cn, the mod field, source register operand ra, and immediate value field imm. The operation of a configuration is indicated as a call of function cfg with the field values cn, mod, ra, and imm as the arguments.

The cfgmri instruction 700 is specified by instruction opcode fields op1 709 and op2 706, which are decoded by the processor instruction decode unit. These opcodes assert controls to read source register ra 702 and the immediate values in the field imm 701. A configuration 110 stored in the configuration register 120 referenced by the configuration field cn 708 is decoded and modified by the instruction mod field 703.

The 4-bit mod field 703 modifies the execution of the configuration read from the configuration register identified by the configuration field cn 708. The instruction mod field 703 modifies the controls, not the contents of the configuration register referenced by the configuration field cn 708. As a result of using modification fields, different instructions can execute the same configuration with different operands and different results. For example, a modification field can specify a register operand to use in place of an operand in the configuration. Further, a modification instruction can modify selected operations.

Indeed, different instructions can be utilized rather than the illustrated 24-bit instruction. Further, the manner in which bits of the 24-bit instruction are allocated are merely illustrative of many different instruction formats. Other bit arrangements can be used. Further, the mod field 703 can be implemented with different numbers of bits resulting in the selection of different numbers of configuration control modifications.

Referring back to FIGS. 5A and 5B, in the example configuration utilizing a 2-bit cfg_mod field (bits 6–7) 508, the cfg_mod field 508 selects the interpretation of the instruction mod field 703 or the type of modification to be implemented. Examples of configuration modifier types include modifying an execution unit operation code, modifying a register number, inhibiting a register write, clearing a register, or stepping a counter. The 2-bit cfg_mod field field 508 provides four interpretations: exclusive-OR the instruction mod field 703 with the ALU opcode, modify the register rw port opcode, over-ride the register number for the register file rw port, and over-ride the register number for the register file rc port.

Referring to FIG. 7B, configuration modifications can be implemented using, for example, a multiplexer 724, a logic function, e.g., exclusive-OR 725, a function A (funA) 726, or a function B (funB) 727. More specifically, the configuration field cn selects the configuration register that will provide a configuration to be executed using, for example, a three bit select multiplexer 710. As a result, the configuration stored in the selected configuration register is passed through the multiplexer 710. The original configuration 720, i.e., the unmodified configuration, includes the cfg_mod field 508. FIG. 7 generally refers to a "mod select" field 722. The mod select field 722 can be the same as the cfg_mod field 508 but is not so limited. However, for purposes of illustration, this specification refers to a mod select field 722 as the cfg_mod field 508. The "mod select" 722/cfg_mod field 508 selects the modifier function 723 that is utilized.

For example, if the instruction mod field 703 is non-zero, the cfg_mod field 508/mod select field 722 selects which modifier function 723 is used to apply the instruction mod field 703 to the original configuration 720 resulting in modified configuration controls 730. The cfg_mod field 508/mod select field 722 can select the multiplexer 724, the XOR logic function 725, the logic function A 726, or the logic function B 727. The modified configuration controls 730 control the execution units.

Reconfigurable Processing System—Loop Operations

Figure 8:
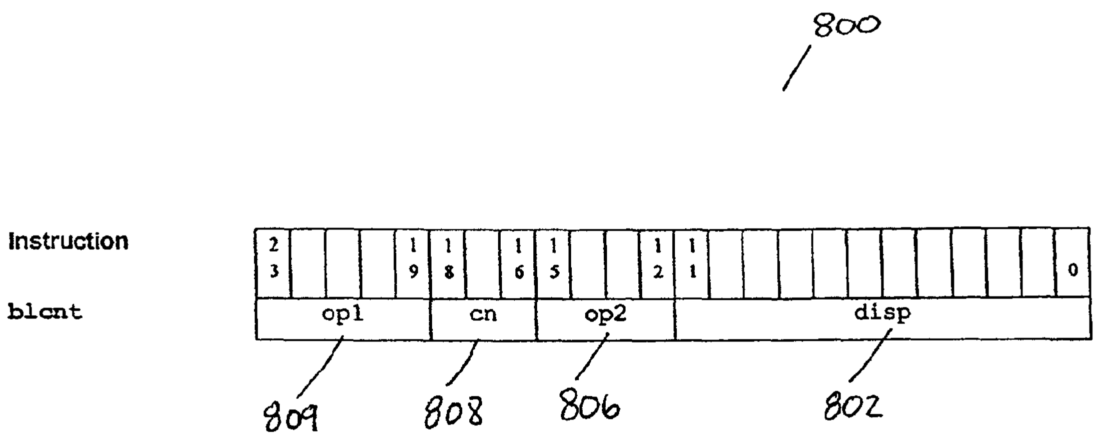
FIG. 8 illustrates an example instruction format for implementing loops in a reconfigurable processing system.

Operations on multiple data elements may be performed in parallel or sequentially on one or more elements at a time. Branch instructions forming loops may be used to repeat the operations needed for each element. One example branch instruction for loops is illustrated in FIG. 8.

The blcnt instruction 800 includes 24 bits (bits 0–23). Beginning from the right side of the blcnt instruction 800, a displacement field disp 802 is allocated twelve bits (bits 0–11). Four bits (bits 12–15) are allocated to an operation code field op2 806, three bits (bits 16–18) are allocated to a configuration field cn 808, and five bits (bits 19–23) are allocated to an operation code op1 field 809. Of course, as with the other described instructions, instructions with different numbers of bits and bit allocations may be utilized.

The blcnt instruction 800 can be described in syntax and operation form as follows:

| | |
|---|---|
| Syntax: | blcnt label \|\| cfg en |
| Operation: | cfg (cn), if (lcnt !=0 && --lcnt != 0) PC+=disp; |

The blcnt instruction 800 is executed in parallel with the configuration stored in the configuration register selected by the configuration field cn 808. The blcnt instruction 800 is specified by opcode fields op1 809 and op2 808, which are decoded by the processor instruction fetch and decode unit. The processor fetch and decode unit asserts controls to decrement the loop counter lcnt 430, compare it with a value of 0, and add the branch displacement 802 to the program counter PC 310 if the loop count is larger than zero. An instruction is provided to initialize the lcnt register 430.

Alternatively, a single-instruction loop that does not use overhead within the loop operation may be utilized. A loop instruction can specify the address of the last instruction in the loop body and decrements the loop counter lcnt 430 each time it automatically "branches" to the top of the loop, which can be the instruction after the loop instruction.

Having described the manner in which configurations are executed in parallel with instructions and how loop operations can be implemented, following is a description of how the example configurations previously described may be loaded and executed with loop instructions.

Assume, for example, that the following configurations are defined in memory by a compiler or programmer with address label cfg_addr1:

```
cfg_addr1:  .config add r0, r0, r1 || mul r1, r2.lo, r3.lo
cfg_addr2:  .config add r0, r0, r1 || mul r1, r2.hi, r3.hi
```

The example configurations add a previous multiplier product r1 to accumulator register r0, and multiply two array elements in r2 and r3 into r1. After the configurations are placed in memory, and the array addresses are initialized in r4 and r5, a sum of products may be accumulated as provided below:

```
ldcr cl, cfg_addr1 * 2  ;  load 2 configurations into
                           c1 and c2 from memory
                           at cfg_addr1
lcnti LEN-1             ;  initialize loop counter
lda r2, (r4++)          ;  r2 = (*r4++)
                        ;  get first two X array values
lda r3 = (*r5++)        ;  r3 = (*r5++)
                        ;  get first two C array values
sub r0, r0, r0          ;  r0=0
sub r1, r1, r1          ;  r1=0
loop end_loop           ;  setup loop
```

-continued

| | | | |
|---|---|---|---|
| beg_loop: | lda r2,(r4++) \|\| cfg c1 | ; | r0 +=r1; r1 = r2.hi * r3.hi |
| end_loop: | lda r3, (r5++) \|\| cfg c2 | ; | r0 +=r1; r1 = r2.lo * r3.lo |
| done: | add r0, r0, r1 | ; | accumulate last product |

The lda instructions load two elements from an array in memory into a register and add a stride offset to the address register to point to the next array element. The lda instruction fetches array elements in parallel with the multiply/add operation controlled by the configuration register. These lda instructions have a latency of two cycles, thus the loop implements a software pipeline where the configurations use the element values loaded by the previous loop instruction.

The lcnti instruction initializes the loop counter lcnt 430 to an immediate length value. The loop instruction remembers beg_loop is the address of the beginning of the loop and remembers that end_loop is the end of the loop body. Each time the PC fetches the instruction at end_loop, the processor decrements the loop counter lcnt and "branches" to beg_loop until lcnt becomes zero. The final sum is in r0 in this example.

Reconfigurable Processing System Method

Figure 9A:
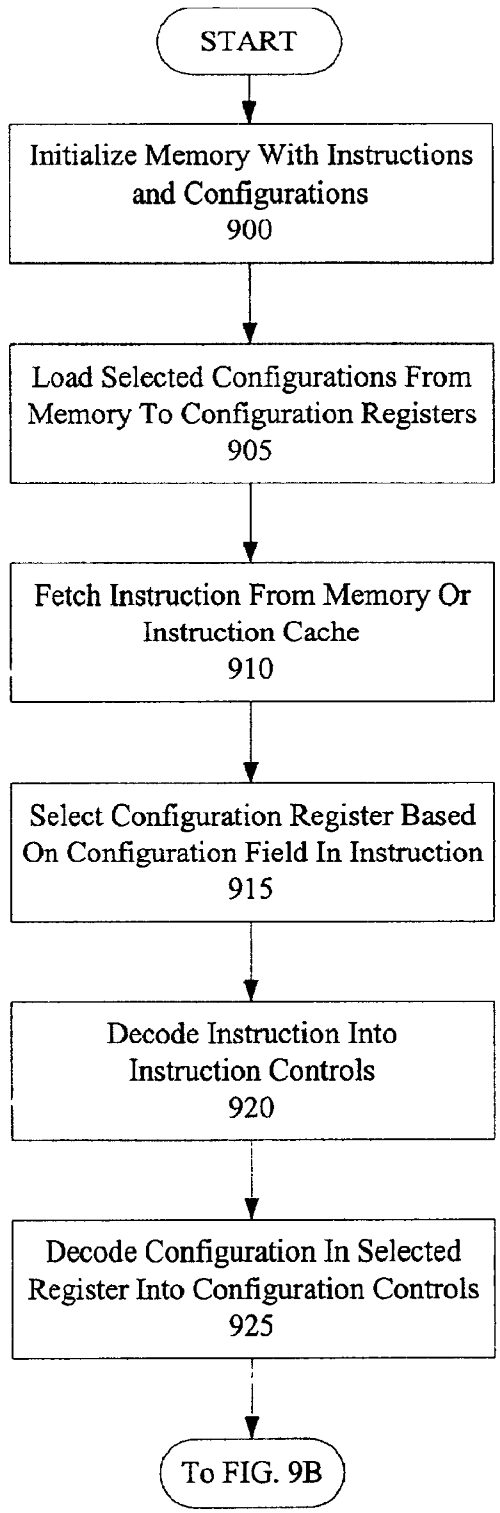
FIGS. 9A–B are flow diagrams illustrating the manner in which instructions and configurations are executed in parallel.
Figure 9B:
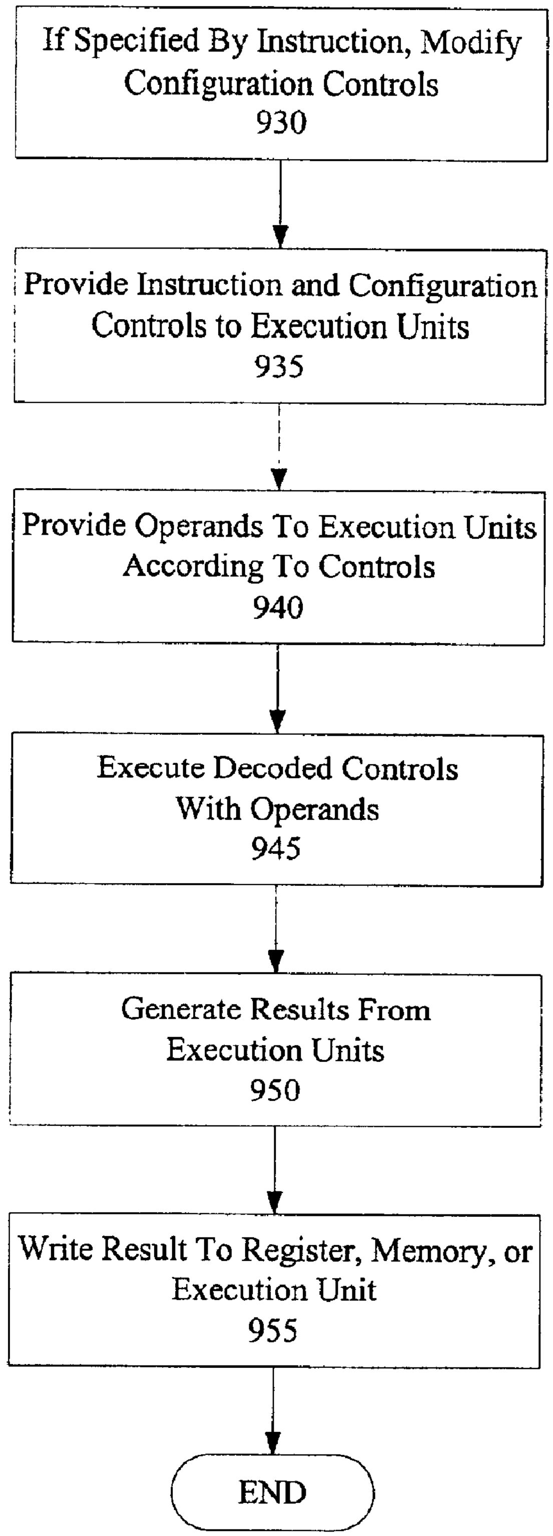

FIG. 9 illustrates a flow diagram that summarizes a method for controlling a reconfigurable processing system. The flow diagram is one example of the method; variations in the ordering and specific details can be made to optimize an implementation.

In block 900, a memory is initialized with instructions and configurations. The memory can be initialized by, for example, a compiler or a programmer.

In block 905, selected configurations are loaded from the memory to one or more configuration registers. In one embodiment, each configuration register stores one configuration. A single instruction can be configured to load one configuration into a configuration register. Alternatively, a single instruction can be configured to load multiple configurations into respective configuration registers.

In block 910, instructions are fetched from the memory or from an instruction cache which holds frequently used portions of the memory.

In block 915, a configuration register is selected based on a configuration field in the fetched instruction. More specifically, the configuration field of an instruction references a configuration register which stores a configuration. An instruction may include a configuration field or be appended to include a configuration field. The link between a configuration register and the configuration field can be established by allocating a binary number to each configuration register. A binary value of the configuration field corresponds to a configuration register with the same binary number. Thus, each binary value in the configuration field identifies or selects a corresponding configuration register, and thus, a corresponding configuration. Over time, a configuration register can store different configurations, and thus, may or may not store the same configuration.

In block 920, the fetched instruction is decoded into instruction controls.

In block 925, the configuration stored in the selected configuration register is decoded into configuration controls.

In block 930, if specified by the instruction, the configuration controls are modified.

In block 935, the instruction controls and configuration controls are provided to execution units.

In block 940, operands processed by the execution units are retrieved from a register or other source such as the instruction that invoked the configuration.

In block 945, the decoded instruction and configuration controls are executed with respective operands. In other words, the instruction and configuration stored in the configuration register referenced by the instruction are concurrently executed and the operands are processed according to respective controls.

In block 950, the execution units generate results.

In block 955, the results are provided to a register, memory, another execution unit, or other storage component.

Of course, the above described method can be varied to optimize an implementation. Thus, the particular example previously described is merely for purposes of illustration.

Reconfigurable Vector Processing System

The previously described control mechanism can be used to process different types of data including scalars, vectors, or a combination of scalars and vectors. Following is a description of how the reconfigurable processor control mechanism can be applied to vectors and scalars if requested, resulting in more efficient parallel processing of vector elements.

As previously explained, vectors are collections or arrays of data elements or values, e.g., scalar values, arranged in one dimension, e.g., a one dimensional array. Example vector operations include element-by-element arithmetic, dot products, convolution, transforms, matrix multiplications, and matrix inversions. As will be understood, the reconfigurable processing system may process only vector elements, non-vector elements, or a combination of vector and non-vector elements as a result of the compatibility of the reconfigurable processor control system with different types of data including vectors.

Figure 10:
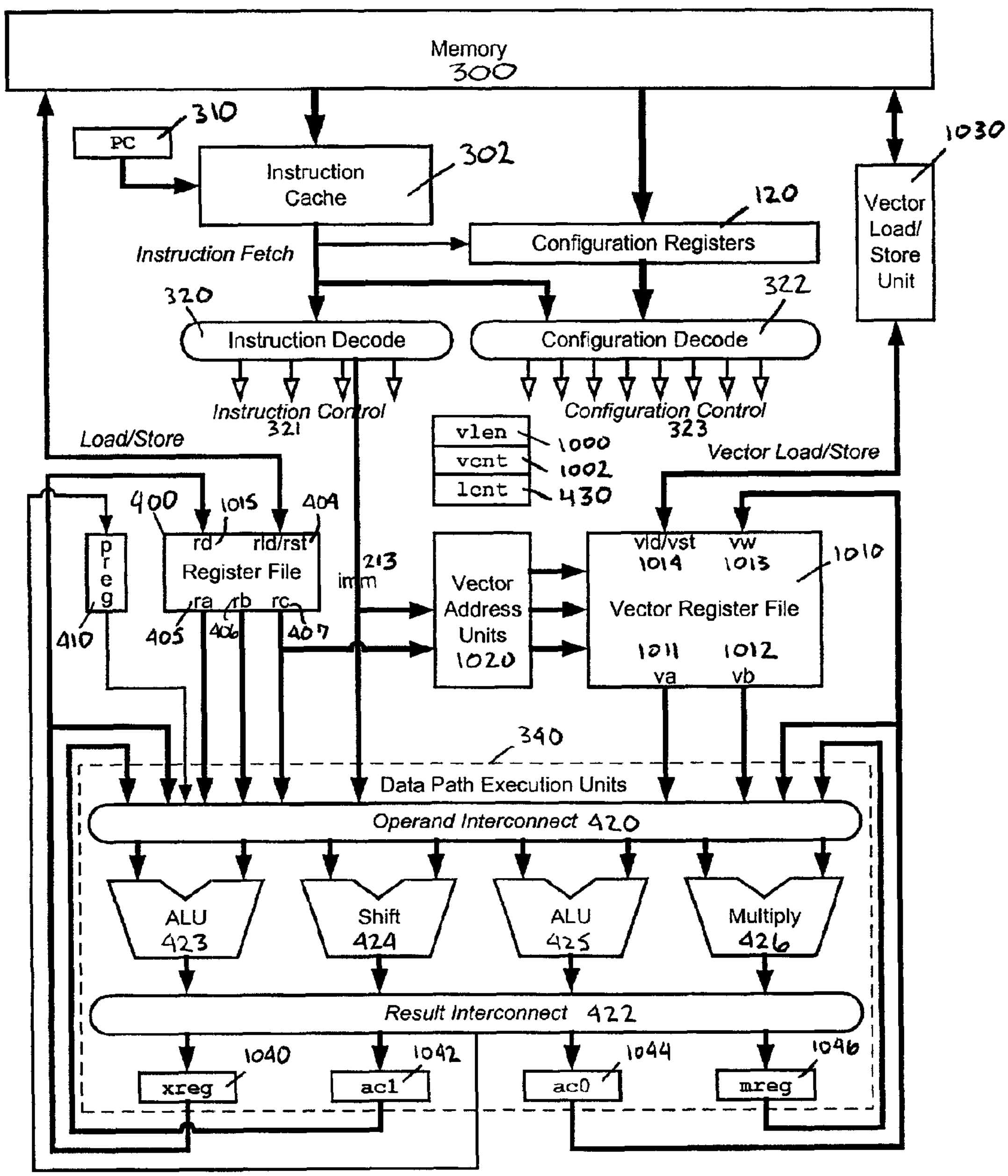
FIG. 10 is a schematic of components utilized to control a reconfigurable processing system while processing data organized as a vector.

Referring to FIG. 10, one implementation of a reconfigurable vector processing system includes a memory 300, an optional instruction cache 302, one or more configuration registers 120, a program counter (PC) 310, an instruction decode unit 320 and resulting instruction controls 321, a configuration decode unit 322 and resulting configuration controls 323, a register file 400, and data path execution units 340.

The reconfigurable vector processing system also utilizes functional units vlen 1000, vcnt 1002, and lcnt 430. Functional unit vlen 1000 indicates the length of a vector, and unit vcnt 1002 counts the number of inner loop iterations that occur while processing a vector, and lcnt 430 counts the outer loop iterations as previously described. For example, assume a vector includes 300 elements (vlen=300). The value vlen=300 is provided to vcnt 1002 and serves as a starting point from which the number of vector elements is decremented after each vector element is processed. This decrement loop continues until vcnt=0, i.e., until all of the vector elements have been processed. The use of these units will be described in further detail in later sections of this specification.

The reconfigurable vector processing system also uses a vector register file 1010, one or more vector address units (VAUs) 1020, and a vector load/store unit 1030. Further, the reconfigurable vector processing system utilizes registers xreg 1040, predicate registers 410, accumulator registers ac0 1042 and ac1 1044, and a multiplier product register mreg 1046 to store results generated by execution units 340.

The vector register file 1010 is an array of registers that holds data and control values. The data or control values can be structured as, for example, vectors, arrays, or lists. Using the vector load/store unit 1030, vectors are loaded from the memory 300 to the vector registers of the vector register file 1010. Vectors may also be stored from the vector register file 1010 to the memory 300.

The vector register file 1010 provides operands to execution units 340 and receives results from the execution units 340. Decoded instructions and configurations control vector register file 1010 accesses via the VAUs 1020 which provide addresses within the vector register file 1010 that provide or receive vector data. More specifically, VAUs 1020 select an address, and vector elements at that address are provided to execution units 340 and accept execution unit 340 results through write and read ports of the vector register file 1010. The VAU 1020 configuration and processing is described later with reference to FIG. 11. Instruction controls 321 and configuration controls 323 configure execution units 340 to obtain operands from the register file 400, predicate registers of preg 410, vector register file 1010, accumulator registers ac1, ac0 1042, 1044, multiplexer product register mreg 1046, immediate instruction values, pipeline registers, and/or memory 300. Results generated by the execution units 340 are written to internal pipeline registers, register xreg 1040, accumulator registers ac1, ac0 1042, 1044, multiplier register mreg 1046, the register file 400, the predicate registers in unit preg 410, the vector register file 1010, memory 300, or some combination thereof.

Following is a more detailed description of the components used in reconfigurable processing system as applied to vectors, including the register file 400, vector register file 1010, VAUs 1020, and related components and instructions.

Reconfigurable Vector Processing System—Register File

The register file 400 used in the reconfigurable vector processing system is similar to the register file previously described in FIG. 4 except that the register file 400 utilized in the vector system can be smaller in size. For example, the register file 400 in FIG. 4 includes three write ports, a write/read port, and five read ports whereas the register file 400 in FIG. 10 includes one write port rd 1015, a write/read port rld/rst 404, and three read ports ra 405, rb 406, and rc 407. By using a register file 400, the reconfigurable vector processing system retains the ability to process non-vector data elements which can be stored in the register file 400 as well as vector elements.

Reconfigurable Vector Processing System—Vector Register File

The example vector register file 1010 holds 256 elements with 32-bit values, or 512 elements with 16-bit values, or 1024 elements with 8-bit values. The vector register file 1010 receives address information in an element by element manner while striding through the elements of an array. Data read from registers in the vector register file 1010 via read ports va 1011 and vb 1012, written to write port vw 1013, and read or written via read/write port vld/vst 1014.

Read ports va 1011 and vb 1012 are coupled to the operand interconnect 420 associated with the execution units 340. The write port vw 1013 is coupled to an output of the execution units 340. The write port vw 1013 is used for vector write operations which write data from a data path execution unit 340.

The vld/vst port 1014 is used to load vectors (vld) from memory 300 or to store vectors (vst) to memory 300 using the vector load/store unit 1030. During a vector load or store instruction, the vector load/store unit 1030 generates memory addresses and vector register file 1010 addresses for each vector element transferred between the memory 300 and the vector register file 1010.

Reconfigurable Vector Processing System—Vector Address Units

Vector address units (VAUs) 1020 generate vector register file addresses. The addresses identify a vector register from which data is read through a read port. The addresses can also identify a vector register to which data is written through a write port.

One read port, port rc 407 of the register file 400, is coupled to an input of the VAUs 1020 to serve as an address bypass. Thus, instead of providing an address from a VAU 1020, address data from a register may be provided to the vector register file 1010. Additionally, immediate values 213 relating to address information can be provided to the vector register file 1010.

Figure 11:
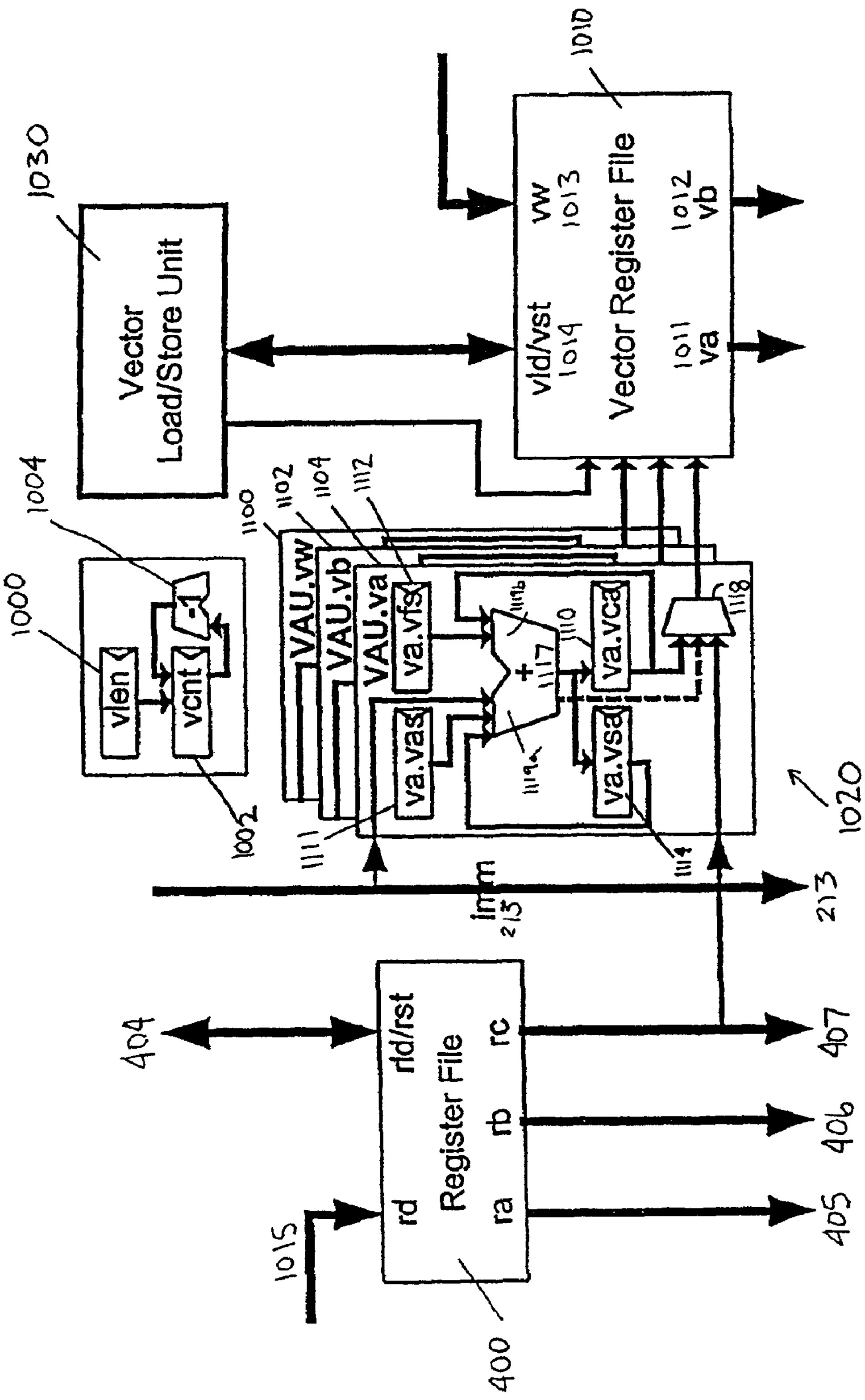
FIG. 11 is a more detailed schematic of a register file, vector address units, and vector register file used in a reconfigurable vector processing system.

A more detailed illustration of VAUs 1020 is provided in FIG. 11. In this example, each port of the vector register file 1010 (excluding the read/write vld/vst port) is allocated to a corresponding VAU 1020. In this example, VAU.vw 1100, VAU.va 1104, and VAU.vb 1102 are provided for respective ports vw 1013, va 1011, and vb 1012 of the vector register file 1010.

Vector address units VAU.va 1104, VAU.vb 1102, and VAU.vw 1100 generate register addresses for their respective ports. For example, in a read request, a VAU 1020 identifies an address and corresponding vector register that will provide data through a particular read port. In a write request, a VAU 1020 identifies an address and corresponding vector register that will be written with data through a particular port.

An example VAU 1020 includes a register configured to store a current address (e.g., vector current address va.vca 1110 of VAU.va 1104) of an element of the vector and an adder 1117 configured to add a stride to the vector current address. For each vector element, the current address is incremented by the stride to identify an address of the next vector element to be processed. The stride can be an implicit stride or an address stride provided by a stride register.

A VAU 1020 can also include registers storing data relating to a start address of the vector (e.g., vector start address va.vsa 1114 of VAU.va 1104), a register configured to store a frame stride (e.g., vector frame stride va.vsa 1112 of VAU.va 1104) that increments the start address with the adder 1117 to identify the start address of a different vector.

With these components, the address of each vector element is identified and accessed according to a base or start address, a current address, an address stride, and an optional frame stride. These addresses are initialized by the program before entering a loop or instruction sequence that steps through the elements of a vector. Vector elements identified by these addresses are processed according to the decoded instruction and configuration controls.

Following is a more detailed description of these VAU 1020 registers, how elements of vectors are processed, and how register values are used to stride or step through the elements of a vector. For simplicity, the following sections of the specification refer to a VAU 1020 generally in terms of "vu" rather than referring to specific VAUs identified by "va", "vb", or "vw". Further, a specific register "reg" within a VAU "vu" is referred to as "vu.reg", e.g., "vu.vsa" 1114.

Vector Address Units—Vector Start Address (VSA)

A vector start address vu.vsa 1114 indicates the address of the beginning of a vector. This address value does not change when the processing system strides or steps through elements of a single vector. Rather, this value changes after processing of a first vector is completed and a second vector is to be processed. The vector start address vu.vsa 1114 is then changed to the address of the beginning of the second vector.

Vector Address Units—Vector Current Address (VCA)

The vector current address register vu.vca 1110 indicates the address of the current vector element that is being processed. The current vector address vu.vca 1110 can be the same as the vector start address vu.vsa 1114, e.g., when a vector is first loaded. However, unlike the vector start address vu.vsa 1114, the vector current address vu.vca 1110 is incremented or decremented to access successive vector elements. During each iteration or after each vector element has been processed, the vector current address vu.vca 1110 is incremented or decremented by a value in the vector address stride vu.vas 1111 register.

Vector Address Units—Vector Address Stride (VAS)

The vector address stride vu.vas 1111 holds the stride value which is added to the vector current address vu.vca 1110 to increment or decrement the address of the current element processed to the next element to be processed. In other words, the stride value represents a signed (±) distance to the next vector element.

The configuration can control whether the current address is held, or incremented by a stride value to step to the next vector element. The stride value may be a fixed value, an instruction immediate value, a configuration register value, or a stride register value.

Vector Address Units—Vector Frame Stride (VFS)

The vector frame stride vu.vfs 1112 provides a signed (±) distance from the beginning or vector start address vu.vsa 1114 of the vector to the beginning or start of the next start address. In other words, after all of the vector elements of a first vector have been processed, the vector frame stride vu.vfs 1112 is added to the vector start address vu.vsa 1114 to increment or step the vector start address of the first element to the start address of the second element. The frame stride may be zero to re-use a vector again.

Vector Address Units—Vector Frame Reload Enable (VFRE)

Some VAUs 1020 can also include a vector frame reload enable vu.vfre (not illustrated). The vu.vfre enables and disables the reload function under program control. For example, when enabled and when the vector count vcnt 1002 decrements to a value of zero signaling that all of the elements of a vector have been processed, the vector frame reload enable vu.vfre adds the vector frame stride vu.vfs 1112 to the vector start address vu.vsa 1114 and reloads the vector current address vu.vca 1110 from the new start address.

Vector Address Units—Adder

The adder 1117 implements the addition of increments (e.g., stride values vu.vas 1111 and vector frame stride vu.vfs 1112) to respective addresses (e.g., vector current address vu.vca 1110 and vector start address vu.vsa 1114). The adder 1117 is illustrated with two inputs **1119*a* and 1119*b*. Input 1119*a* may be one of three inputs: the vector start address vu.vsa 1114, the vector address stride vu.vas 1111, or any immediate values 213 provided by the instruction. The value of the adder input 1119*b* may be one of two inputs: the vector frame stride vu.vfs 1112 or the vector current address vu.vca 1110. The output of the adder 1117 is provided to the vector current address vu.vca 1110. The adder 1117 output may also be provided to the vector start address vu.vsa 1114, or to the multiplexer 1115**.

Vector Address Units—Multiplexer

The VAU 1020 also includes a multiplexer 1118 which serves to select an address that is provided to the vector register file 1010. The address data that can be provided through the multiplexer 1118 to the vector register file include: the vector current address vu.vca 1110, the output of the register file rc port 407, immediate values from the instruction, or the sum of vu.vca 1110 and an immediate value.

If an address other than an address generated by the vector address unit 1020 is utilized, the multiplexer can select a different input, e.g., port rc 407, to bypass the VAU 1020/vector current address vu.vca 1110. This bypass function can be used to perform table look up functions or other data dependent addressing functions. For example, a table look up operation can be performed such that the data is converted into an index or address value and stored in the register file 400. This register file 400 value can then be provided to the vector register file 1010 as an address to effectively implement a table look up through a table in the vector register file 1010.

Vector Load/Store Unit

In one embodiment, the vector load/store unit 1030 generates vector register addresses (and memory addresses) for each element it loads or stores. The vector load/store unit 1030 can operate concurrently with the vector processor, performing vector load and vector store instructions in the background while the processor continues execution in a manner similar to the concurrent operation of a load configuration ldcr instruction. The programmer or compiler can hoist vector load instructions to a point early in the program instruction sequence, so as to allow useful computation to proceed during the vector load, thus covering or hiding the latency to memory. A vector load or store instruction specifies an address in memory of a vector, and a vector length. It may use an implicit stride or an explicit stride register. It may use a VAU to specify the vector register addresses.

An example vector load instruction similar to a ldcrx instruction is:

| | |
|---|---|
| Syntax: | vld (ra, stride) *rlen |
| Operation | Load vector registers specified by a VAU with a vector of zero or more elements. The vector address is in register ra. The length is in register rlen. The stride is an immediate field. |

As illustrated, a separate vld/vst port 1014 is utilized to eliminate interference between vector load/vector store transfers and vector computation. In one such embodiment, the configuration can specify that a vector computation is interlocked with a vector load, element by element. Following a vector load instruction which may not have completed yet, such interlocking permits vector computation to proceed when the requisite elements have been loaded, rather than waiting for the whole vector load to complete. One embodiment of the interlock stalls the processor whenever the vector current address vu.vca 1110 equals the vector current address of the vector load. Another embodiment stalls the processor whenever the vector current address is within a pre-determined range of the vector load address.

Reconfigurable Vector Processing System—Example Processing of Vector Elements

The following example illustrates how the previously described system can be used to process a vector element by element by striding or stepping through each vector element using the VAU 1020 and vector register file 1010.

Initially, a vector is loaded into a vector register file 1010. The address within the vector register file 1010 is stored as the vector start address vu.vsa 1114. This value is also provided to the vector current address vu.vca 1110. Thus, at this time, the vector start address vu.vsa 1114 is the same as the vector current address vu.vca 1110.

A value representing the length of the vector that was loaded into the register file is stored in vlen 1000. The vector length vlen 1000 varies depending on the particular application. A vector with 200 elements (elements 0–199) is used as an illustrative example. This initial vlen 1000 value is provided to vcnt 1002. The value in vcnt 1002 represents the remaining number of vector elements to be processed and is decremented by 1 each time an element is processed. Thus, the vcnt 1002 register is decremented from 200 to 199, to 198, to 197, . . . and eventually to a value of zero.

After loading the first vector, the vector start address is provided through the vector current address va.vca register 1110, through the multiplexer 1118, and to the vector register file 1010. The first element of the vector stored in this address is processed with the instruction controls 321 and/or configuration controls 323.

After the first element is processed, vcnt 1002 decrements by one from 200 to 199. Additionally, the vector current address va.vca 1110 is provided to the adder 1117 to input 1119*b* together with the vector address stride va.vas 1111 to input 1119*a*. As a result, the adder 1117 increments the vector current address va.vca 1110 from the initial value of the vector start address va.vsa 1114 to a new vector current address va.vca 1110. This new or second vector current address va.vca 1110 represents the address of the second vector element to be processed. The incremented vector current address va.vca 1110 is provided through the multiplexer 1118 to the vector register file 1010. The vector element stored in this address is then processed with instruction controls 321 and/or configuration controls 323. The vector start address va.vsa 1114, however, remains unchanged since some elements of the first vector still have not been processed.

When the second vector element has been processed, the adder 1117 adds the vector address stride va.vsa 1115 in input 1119*a* and the vector current address va.vca 1110 in input 1119*b* to again increment, step, or stride the vector current address va.vca 1110 to the next element of the vector, i.e., the third vector element. After the second element is processed, vcnt 1002 decrements by one from 199 to 198. The third vector current address va.vca 1110 is provided through the multiplexer 1118 to the vector register file 1010. The third vector element is then processed with instruction controls 321 and/or configuration controls 323 through one or more of the vector register ports. The vector start address va.vsa 1114 still remains unchanged.

The previously described adding and incrementing process repeats for each element of the vector. Eventually, the reconfigurable vector processing system strides through all of the vector elements of the first vector resulting in vcnt=0. Upon processing all of the elements of the first vector, the processing system begins to process the next or second vector. To shift from the first vector to the second vector, the adder 1117 processes different input values. Instead of vector current address va.vca 1110 and vector address stride va.vas 1111 values, input 1119*a* receives the vector start address va.vsa 1114 (i.e., the start address of the first vector) and the vector frame stride va.vfs 1112 to input 1119*b*. As a result, the vector start address va.vsa 1111 is incremented by the frame stride va.vfs 1112 to the "second" address, i.e., the start address of the second vector. This new start address is written to both the vector start address va.vsa 1114 and the vector current address vu.vca 1110, so they have the same value.

The second vector is processed in the same manner as the first vector—striding through each element of the second vector by adding the vector address stride va.vas 1111 to the vector current address va.vca 1110 until all elements of the second vector have been processed.

As will be understood, the adder 1117 can be used when an inner vector loop is completed as indicated by the vector counter vcnt 1002 reaching a value of zero, under the configuration control, the vector current address vu.vca 1110 and the vector start address vu.vsa 1114 may be reloaded to the sum of vector start address vu.vsa and vector frame stride vu.vfs 1112. This adder function may be used to implement a convolution or other nested loop structure with low overhead.

With this system, an instruction can operate in parallel with a vector computation using a load port of the vector register file. Further, the instruction can process the first vector element by element by interlocking between the load port of the vector register file and the vector computation to remove startup delay.

Reconfigurable Vector Processing System—Configuration Registers

Figure 12A:
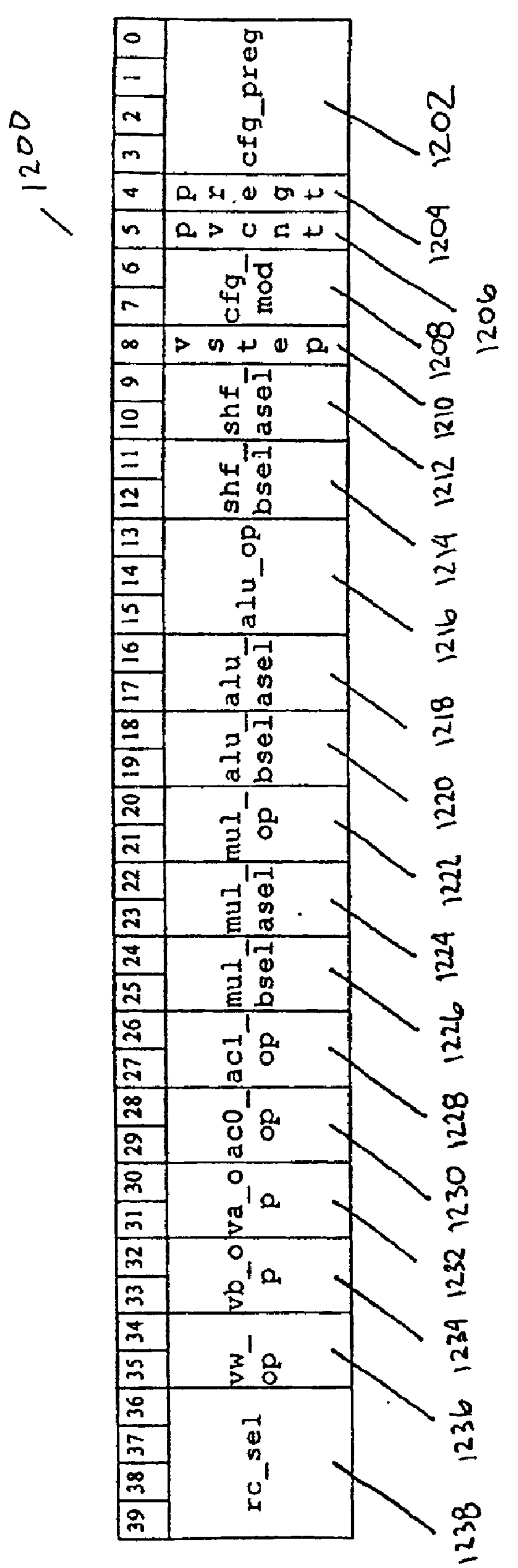

FIGS. 12A–B provide more detailed designs or arrangements of configuration registers 120 that can be used with this vector processing system. With these configuration registers 120, configurations 110 are invoked which control various aspects of the vector processing, e.g., specifying the operations to be performed on data retrieved from the vector register file through a particular port or selecting the register which will provide address data to the VAU 1020 and vector register file 1010.

As previously explained, using a relatively narrow instruction 100 that invokes one or more configurations 110 (which may be narrower, the same width as, or wider than the instruction), enhances processing parallelism, speed, efficiency, and instruction density. Further, in a pipelined implementation, the configuration registers 120 can control several stages of pipeline registers.

FIGS. 12A–B illustrate an example 40-bit configuration register 1200 that can be used in the reconfigurable vector processing system. This example configuration register 1200 includes 40 bits, whereas the previous example configuration register illustrated in FIGS. 5A–B included 64 bits. The 40-bit configuration register 1200 controls the resources of the reconfigurable vector processing system with control fields for conditioned or predicated configuration execution, configuration modification, vector element counting, ALU operation, ALU operand select, multiply operation, multiply operand select, shift operand select, accumulator operation, and vector address operations.

Specifically, a four-bit cfg_preg field (bits 0–3) 1202 selects a predicate register that conditions or predicates the execution of a configuration based on the value of the selected predicate register, i.e., when the predicate register selected by cfg_preg¯pregt 1204.

A one-bit field (bit 4) 1204 is allocated to the pregt field 1204. If the value of pregt 1204 equals the value in the predicate register selected by the cfg_preg field 1202, the configuration is executed.

A one bit field (bit 5) is allocated to a pvcnt field that predicates the execution of a configuration on a non-zero vector count, vcnt 1002. In other words, if the vcnt register is non-zero, then the configuration executes. Otherwise, a null operation is performed.

A two bit cfg_mod field 1208 (bits 6–7) is used to select one of four configuration modifiers, e.g., 0=ALU operation modification, 1=VAU operation modification, 2=register number rc modification, and 3=accumulator operation modification.

One bit (bit 8) is for the field vstep 1210 which steps or decrements the value of loop counter vcnt 1002.

Bits 9–29 are used to either designate operands which will be processed by an execution unit or to select an operation to be performed by an execution unit (e.g., ALU 425).

Specifically, a two bit shf_asel field (bits 9–10) 1212 selects operand A that will be shifted by the data path shift execution unit 424. The operand may be provided from a vector register file read port (va) 1011, one of the accumulator registers (ac0 1044 or ac1 1042) or a register file read port (ra) 405 depending on the value of bits 9 and 10.

Similarly, two bits (bits 11–12) are provided for the field shf_bsel 1214 which selects an operand B that will specify the shift amount or distance of the data path shift execution unt 424. The operand may be provided from a read port vb 1012 of the vector register file 1010, an accumulator register ac0 1044, or read ports rb 406 or rc 407 of the register file 400 depending on the value of bits 11 and 12.

A three bit field alu_op (bits 13–15) 1216 selects one of eight possible operations that will be performed by an ALU execution unit 425. For example, the three bits may be used to select the following ALU operations: 0=pass, 1=add, 2=sub, 3=min, 4=max, 5=and 6=or, 7=xor. Two bits (bits 16,17) are used for the field alu_asel 1218 to select operand A which will be processed by an ALU 425. The operands are selected from one of four sources depending on the value of bits 16 and 17, e.g., 0=va, 1=ac0, 2=ra, 3=mreg. Similarly, two bits (bits 18,19) are provided for the field alu_bsel 1220 to select operand B which will be processed by an ALU 425 in a similar manner: 0=vb, 1=ac0, 2=rb, and 3=ac1.

The two-bit field mul_op (bits 20–21) designate an operation performed by the multiplier 426. For example, the field values may designate multiplier 426 operations in which the operands have the following signed/unsigned characteristics: 0=operands A and B are signed, 1=operand A is signed and operand B is unsigned, 2=operand A is unsigned and operand B is signed, and 3=operands A and B are unsigned.

Bits 22–23 are provided for the mul_asel field 1224, and bits 24–25 are provided to the mul_bsel field 1226. These fields select operands that will be processed with the multiplier unit 426 with the signed/unsigned designations provided in the mul_op field 1222. Specifically, values of the mul_asel field 1224 provide the source of operand A with the following bit representations: 0=read port va of vector register file, 1=accumulator register 0, 2=read port ra of register file, and 3=read port rc of register file. Similarly, values of the mul_bsel 1226 field provide the source of operand B with the following bit representations: 0=read port vb of vector register file, 1=accumulator register 0, 2=read port rb of register file, and 3=read port rc of register file 400.

Bits 26–27 and 28–29 are allocated to respective ac1_op 1228 and ac0_op 1230 fields to designate the type of operation to be performed by accumulator execution units. For example, the accumulator operations may be specified by bit values as follows: 0=hold, 1=write ALU output, 2=write multiplier output, and 3=write shift output.

Bits 30–35 are provided to fields va_op 1232, vb_op 1234 and vw_op 1236 to designate the operation of vector register ports va 1011, vb 1012, and vw 1013. Specifically, for va_op 1232 (bits 30–31), the bit representations are as follows: 0=no read, hold address va.vca, 1=read address rc and hold current address va.vca, 2=read address va.vca and hold address va.vca, and 3=read address va.vca and step current address va.vca. The operation of the write port vb 1012 of the vector register file 1010 can be represented through field vb_op 1234 (bits 32–33) as follows: 0=no read, hold address vb.vca, 1=read address rc and hold current address vb.vca, 2=read address vb.vca and hold address vb.vca, and 3=read address vb.vca and step current address vb.vca. Similarly, the operation of the write port vw 1013 of the vector register file 1010 maybe represented through the field vw_op 1236 (bits 34–35) as follows: 0=no write, hold address vw.vca, 1=write address rc and hold current address vw.vca, 2=write address vw.vca and hold address vw.vca, and 3=write address vw.vca and step current address vw.vca.

Finally, a four bit rc_sel field (bits 36–39) 1238 selects one of 16 registers which provides data through read port rc 407 of the register file 400 for configurations that select register port rc 407 as an operand.

Reconfigurable Vector Processing System—Configuration Modification

Configurations used in the vector processing system can also be modified as previously described with reference to FIGS. 7A–B. One embodiment of an instruction includes an instruction field mod. When an instruction with a configuration modifier is issued, the instruction uses the modifier field to alter the control signals decoded from the configuration stored in the selected configuration register. Different instructions can then execute the same configuration within the same configuration register using different data and generating different results. Examples of configuration modifier types include modifying an execution unit operation code, modifying a register number, inhibiting a register write, clearing a register, or stepping a vector address.

Reconfigurable Vector Processing System—Vector Loop Instructions

The reconfigurable vector processing system can also utilize loop instructions to process the elements of vectors, similar to loop instructions previously described. Operations on multi-element vectors can be performed on multiple elements in parallel or sequentially on one or more elements at a time. One embodiment utilizes branch instructions to form loops that repeat the operations needed for each vector element.

Figure 13:
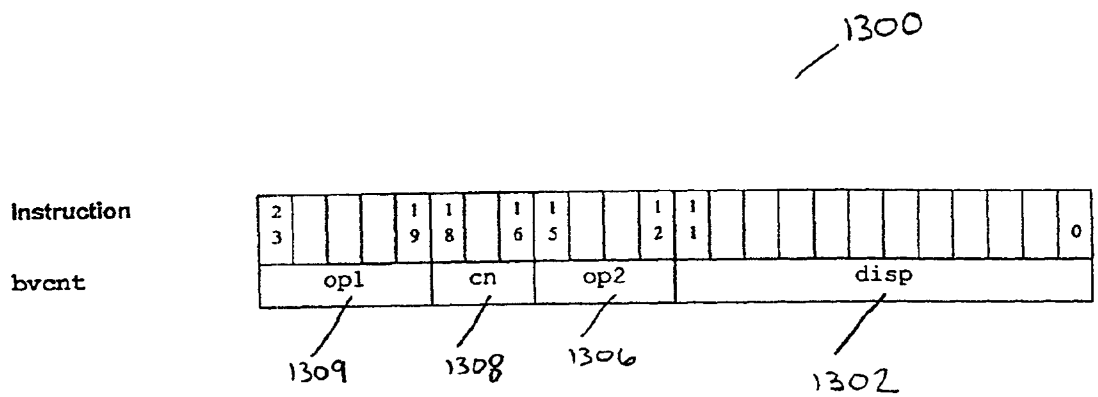
FIG. 13 illustrates an example instruction format implementing a loop function within a reconfigurable vector processor.

FIG. 13 illustrates an example bvcnt instruction 1300, similar to the blcnt 800 instruction in FIG. 8, that is represented in the following syntax and operation form:

| | |
|---|---|
| Syntax: | bvcnt tcnt, label \|\| cfg cn |
| Operation: | cfg(cn), if (vcnt !=0 &&--vcnt > tcnt)PC += disp; |

The bvcnt instruction 1300 includes a displacement field disp 1302, opcode fields op1 1306 and op2 1309, and a configuration field cn 1308. The bvcnt instruction 1300 asserts controls to decrement the vector count vcnt 1002, compare it with terminal count tcnt, which is encoded in op2, and add the branch displacement disp 1302 to the program counter PC 310 if the vector count vcnt 1002 is larger than tcnt. Instructions vcnt and vcnti are provided to initialize the vcnt register from a register or immediate value.

The terminal count tcnt provides the ability to exit the loop body before all of the vector elements have been processed. In this case, the end sections or loop iterations can be executed with instructions other than instructions in the loop body. For example, if a vector includes 100 elements, and 99 elements are processed with the loop body, using a bvcnt instruction with a tent field of 1, when vcnt reaches a value of 1, the loop terminates, and a different instruction can be invoked to process the last vector element. Thus, the tent field of the bvcnt instruction provides further flexibility and control in exiting the body of a loop operation to process remaining elements with different instructions if necessary.

Additionally, a single-instruction loop may be formed with a bvcnt instruction 1300 to itself, where the specified configuration performs the operation during each iteration of the loop with the following syntax representation:

loop: bvcnt 0, loop || cfg cl

Further, the blcnt 800 and bvcnt 1300 instructions can both be used together to process non-vector data and vectors with corresponding loop operations. The blcnt instruction 800 can be useful for outer loops with a nested inner bvcnt 1300 loop. The bvcnt instruction 1300 is executed in parallel with the configuration 110 stored within the configuration register 120 selected by the configuration field cn 1308.

Having described the manner in which configurations are executed with instructions in the reconfigurable vector processing system, following are examples of how configurations are loaded and executed with loop instructions to process digital signal processing kernels such as finite impulse response (FIR) filters with operations on non-vector and vector data.

Reconfigurable Vector Processing System—FIR Filter Examples

As a first FIR filter example for a single sample point, the example configuration below specifies a multiply-accumulate operation on two vector elements as performed in, for example, an inner loop of a FIR filter:

```
Syntax:     cfg_label: .config add ac0, ac0, mreg || mul mreg, v(va++),
            v(vb++)
Operation:  ac0 += mreg, mreg = *va++* *vb++;
```

The example adds the previous multiplier product mreg 1046 to accumulator ac0 1044, multiplies the two vector elements into mreg 1046, and steps the vector addresses va 1011 and vb 1012, in parallel with the instruction that selects the configuration.

Once the above configuration is loaded into the configuration register c1, and the vector addresses are initialized, the example below accumulates a sum of products:

```
Assembler Code:                   ;   Operation Comment

vcnti VLEN-1                      ;   vcnt = VLEN-1
waci ac0, 0 || cfg cl             ;   ac0=0; mreg=*va++* *vb++;
vloop: bvcnt 0, vloop || cfg cl   ;   ac0 += mreg
                                  ;   mreg = *va++* *vb++
                                  ;   --vcnt;
done:
```

The vcnti instruction initializes the vector counter vcnt 1022 to an immediate vector length value of VLEN-1. The waci instruction writes accumulator 0 (ac0) 1044 with an immediate value 233 of 0, while executing the configuration for the first multiplication of the first two vector elements. The bvcnt instruction 1300 at label vloop is a branch on vector count instruction that branches to vloop until the vector count runs out. On each step, the instruction also executes the configuration in configuration register c1 120, performing a multiply and accumulate operation while decrementing the vector count register vcnt 1002.

A second FIR filter example that processes both vector and non-vector data utilizes the two following example configurations which define a kernel of a FIR filter:

```
cfg_addr1:  .config   add ac0, mreg, ac0 || vstep || mul mreg, v(va++)
cfg_addr2:  .config   shift ac0, ac0, r8 || wvr v(vw++), ac0
```

The two configurations are defined in memory, loaded into two configuration registers, and decoded when selected by a configuration field cn of an instruction. The first configuration definition performs a vector element multiply, steps the vector counter and addresses, adds the previous product to accumulator register ac0 1044, and forms the pipelined inner loop of an FIR filter. The second configuration shifts the accumulated result of the inner loop and writes one element of the vector result, forming the outer loop of an FIR filter.

The following code uses the configurations to implement a FIR filter function:

```
/*
* fir (vdata, vtaps, vfirout, ndata, ntaps, nshift)
* arguments passed in r3–r8.
*/
          Assembler Code:            ;  Operation Comment

fir:      ldcr cl, cfg_addr1 * 2     ;  load configurations into c1, c2
          vsa va, r3                 ;  data vector start address
          vasi va, -2                ;  data vector address stride
          vfsi va, 2                 ;  data vector frame stride
          vsa vb, r4                 ;  tap vector start address
          vasi vb, 2                 ;  tap vector address stride
          vfsi vb, 0                 ;  tap vector frame stride
          vsa vw, r5                 ;  output vector start address
          vasi vw, 2                 ;  output vector address stride
          lcnt r6                    ;  outer loop trip count = ndata
          vcnt r7                    ;  inner loop trip count = ntaps
outloop:  waci ac0, 0 || cfg c1      ;  ac0 = 0 ; mreg = *va++* *vb++;
                                     ;  --vcnt;
vloop:    bvcnt 0, vloop || cfg c1   ;  ac0+=mreg;
                                     ;  mreg = *va++* *vb++; --vcnt;
          blcnt outloop || cfg c2    ;  *vw++ = ac0 << nshift;
done:     ret                        ;  return
```

The ldcr instruction 600 loads two configuration registers c1 and c2 from memory. The load occurs in the background while subsequent instructions execute. If an instruction requests a configuration register that is busy loading, then the instruction is stalled until the configuration register is loaded. Once the loading is completed, an instruction with a parallel configuration may use configuration registers c1 and c2 to reconfigure the processor. The VAUs 1020 are set up with an address stride 1111 for each element and each filter tap in the inner loop. The VAUs 1020 write one result element for each outer loop, and reload the inner loop address pointers using a frame stride 1112. The lcnt instruction sets the number of trips for the outer loop. The vcnt instruction sets the vector count register 1002 vcnt and vector length register vlen 1000 to the number of filter taps and trips for the inner loop. The vcnt register 1002 is reloaded automatically from vlen 1000 each time a zero value is reached.

The instructions in the loop body are executed during each iteration of the loop. Configurations in configuration registers c1 and c2 are executed in parallel with the instructions. The processor dynamically reconfigures with the configurations from configuration registers c1 and c2 without the expense of additional clock cycles.

Thus, the reconfigurable processing system can process multiple vector elements, one or more vector elements and non-vector data, or multiple non-vector data, as illustrated in the previous FIR filter example.

Reconfigurable Vector Processing System—Processing Technique

One technique for processing vectors with configurations is by "unrolling" the instruction loop that issues the configurations for the vector operations. One example that illustrates concurrent processing of both vector and non-vector data is as follows:

```
cfg_addr1: .config   add   ac0,mreg,ac0 || vstep || pvcnt || mul mreg,
v(va++), v(vb++)
          Assembler Code:           ; Operation Comment

start:
          ldcr c1, cfg_addr1 * 1    ; load configuration into c1
          . . .                     ; set up vector address units similar to
                                      FIR example
          vcnt r7                   ; inner loop trip count = ntaps
          waci ac0,0 || cfg c1      ; ac0 = 0; mreg = *va++ * *vb++;
          instruction-1 || cfg c1   ; scalar instruction || vector operation
          instruction-2 || cfg c1   ; scalar instruction || vector operation
          instruction-3 || cfg c1   ; scalar instruction || vector operation
          . . .
          instruction-n || cfg c1   ; scalar instruction || vector instruction
          bpf pvcnt done            ; check if vector counter done
                                    ; vector longer than instruction
                                    ; sequence,
                                    ; finish vector operation
vloop:    bvcnt 0, vloop || cfg c1  ; ac0 += mreg
                                    ; mreg = *va++ * *vb++
                                    ; --vcnt;
done:     ret                       ; return
```

A configuration to perform each individual vector element operation can be attached to the sequential instructions that have a configuration field cn. As provided above, the instruction sequence for sequential scalar operations are issued normally as instruction-1, instruction-2, but with a || cfg c1 attached to each instruction. The configurations decrement the vector counter vcnt 1002 and are predicated on the vector count being non-zero with the pvcnt 1224 or cfg_preg 1202 fields of the configuration. Thus, if the vector operation completes before the instruction sequence does, the vector operation terminates when completed. As a result, a programmer or can schedule the sequential scalar sequence independently of the vector length, and attach a configuration to every instruction. The predicated configurations become null operations when the vector count vcnt 1002 reaches zero. Thus, the previous example program for the example embodiment handles the cases in which the vector length vlen 1000 is shorter, the same as, or longer than the independent sequential instruction sequence.

To execute vector operations that require more than one configuration per vector element, a repeating pattern of configurations may be attached to the instruction sequence.

Based on the forgoing, different types of data, including vector and non-vector data, may be processed using processing controls that provide for more efficient parallel processing. By invoking configurations that can utilize one or more execution units in parallel with the original instruction, parallel processing throughput and instruction density increase. Additionally, external processors or control systems are not needed to manage these parallel configurations. The application program can schedule reconfiguration "just in time" by loading configuration registers prior to use. The system is flexible in that different types of data may be processed, and configuration controls may be modified.

Certain presently preferred embodiments of method and apparatus for practicing the invention have been described herein in some detail and some potential, both in structure and in size, and additions that may be utilized as alternatives. For example, although the system was described as using 24-bit instructions and 3-bit configuration fields, other instructions and field arrangements can also be utilized. Additionally, the execution of operations and configurations in parallel may be applied to vector, non-vector, or a combination of vector and non-vector operations and processing. Other modifications, improvements and additions not described in this document may also be made without departing from the principles of the invention.

What is claimed is:

1. A method of controlling a reconfigurable processor, comprising:

executing a first instruction that loads a configuration into a configuration register;

executing a second instruction that references the configuration register; and executing the configuration in the configuration register referenced by the second instruction, wherein executing the first instruction loads a plurality of configurations into respective configuration registers, wherein one of the plurality of configurations is loaded into a configuration register, and wherein the configuration and the first instruction are stored in a memory, and wherein the first instruction includes a displacement field indicating a location in the memory of the configuration relative to the first instruction.

2. The method of claim 1, wherein executing the first instruction loads a plurality of configurations into respective configuration registers, wherein one of the plurality of configurations is loaded into a configuration register.

3. The method of claim 1, wherein an application program issues the first instruction.

4. The method of claim 1, wherein a compiler generates the first instruction.

5. The method of claim 1, wherein executing the second instruction and the configuration further comprises retrieving operands requested by the second instruction and the configuration.

6. The method of claim 5, wherein the second instruction provides the operands to the configuration.

7. The method of claim 5, wherein a register provides the operands to the configuration.

8. The method of claim 5, wherein the second instruction includes an immediate value field, the second instruction being executed with values stored in the immediate value field.

9. The method of claim 5, wherein the second instruction includes an immediate value field, the configuration being executed with values stored in the immediate value field.

10. The method of claim 1, further comprising:

decoding controls from the second instruction and the configuration; and processing data according to the decoded controls with one or more execution units in parallel.

11. The method of claim 10, further comprising generating one or more results with the one or more execution units.

12. The method of claim 11, further comprising writing the one or more results to a register.

13. The method of claim 11, further comprising storing the one or more results to a memory.

14. The method of claim 11, further comprising providing the one or more results to respective execution units.

15. The method of claim 1, further comprising preloading a second configuration register with a configuration while the configuration previously loaded in the first configuration register executes.

16. The method of claim 1, further comprising stalling the second instruction while the referenced configuration register is being loaded with a configuration.

17. The method of claim 1, wherein the first instruction, the second instruction, and the configuration are executed as part of an application program.

18. The method of claim 1, wherein executing the second instruction and the configuration includes performing an operation on scalar data.

19. The method of claim 1, wherein executing the second instruction and the configuration includes performing an operation on vector data.

20. The method of claim 1, wherein executing the second instruction and the includes performing an operation on scalar data and performing an operation on vector data.

21. A processing system, comprising:

means for executing a first instruction that loads a configuration into a configuration register; and means for decoding a second instruction and the configuration, the second instruction referencing the configuration register containing the configuration means for executing the second instruction and the configuration in parallel, wherein one of the plurality of configurations is loaded into a configuration register, and wherein the configuration and the first instruction are stored in a memory, and wherein the first instruction includes a displacement field indicating a location in the memory of the configuration relative to the first instruction.

22. A method of implementing a vector processing system, comprising:

executing a first instruction that loads a configuration into a configuration register;

executing a second instruction and a configuration stored in a configuration register referenced by the second instruction;

processing elements of a first vector according to the second instruction and the configuration, wherein a vector register stores elements of the first vector, and a vector address unit provides an address to the vector register which stores the first vector elements selected by the second instruction and the configuration.

23. The method of claim 22, wherein processing elements of the first vector further comprises writing data to the identified address through a write port of the vector register file.

24. The method of claim 22, wherein processing elements of the first vector further comprises reading data from the identified address through a read port of the vector register file.

25. The method of claim 22, wherein processing elements of the first vector further comprises:

initializing a current address of the first vector with a start address;

processing a first element of the first vector referenced by the current address with the instruction and configuration.

26. The method of claim 25, further comprising:

incrementing the current address with an address stride, wherein the incremented current address represents an address of a second element of the first vector; and processing the second element referenced by the incremented current address.

27. The method of claim 26, for each successive element of the first vector, further comprising:

incrementing the previous current address with the address stride resulting in a new current address, wherein each successive new current address represents an address of a successive vector element; and processing each successive vector element until all of the elements of the first vector have been processed.

28. The method of claim 27, further comprising identifying a start address of a second vector.

29. The method of claim 28, wherein identifying the start address of the second vector further comprises incrementing the start address of the first vector with a frame stride resulting in a second start address, wherein an initial value of a current address comprises the second start address.

30. The method of claim 29, further comprising processing the vector element referenced by the current address of the second vector.

31. The method of claim 30, for each successive vector element of the second vector, further comprising:

incrementing the previous current address with the address stride resulting in a new current address, wherein each successive new current address represents an address of a successive vector element of the second vector; and processing each successive vector element until all of the elements of the second vector have been processed.

32. The method of claim 31, for each vector to be processed, further comprising:

identifying a start address of the vector;

processing a first element of the vector;

processing remaining successive elements of the vector by incrementing the current address with an address stride resulting in successive current addresses;

processing corresponding successive elements referenced by the successive current addresses; and after all of the elements of the vector have been processed, incrementing the start address by the frame stride to identify a start address of the next vector to be processed.

33. The method of claim 22, wherein a vector of data elements is loaded into the vector file prior to execution of the second instruction and the configuration.

34. The method of claim 22, wherein a vector of data elements is loaded into the vector file in parallel with execution of the second instruction and the configuration.

35. The method of claim 34, wherein the first instruction operates to process the first vector element by element by interlocking between the load port of the vector register file and the vector computation to process each element when it arrives in the vector register file.

* * * * *

UNITED STATES PATENT AND TRADEMARK OFFICE

CERTIFICATE OF CORRECTION

PATENT NO. : 6,959,378 B2
DATED : October 25, 2005
INVENTOR(S) : Nickolls et al.

It is certified that error appears in the above-identified patent and that said Letters Patent is hereby corrected as shown below:

Title page,
Item [56], References Cited, OTHER PUBLICATIONS,
"WO 99 42922 A (Knuth Robert); Siemens AG…" reference, delete "Granot)" insert -- Granot --.

Column 29,
Line 8, after "and the" insert -- configuration --.
Line 12, delete "and".
Line 15, after "the configuration" insert -- ; and --.
Line 30, after "instruction;" insert -- and --.
Line 49, after "address;" insert -- and --.

Signed and Sealed this

Eleventh Day of April, 2006

JON W. DUDAS
*Director of the United States Patent and Trademark Office*